(12) United States Patent
Hadap et al.

(10) Patent No.: US 8,538,737 B2
(45) Date of Patent: Sep. 17, 2013

(54) CURVE EDITING WITH PHYSICAL SIMULATION OF MASS POINTS AND SPRING FORCES

(75) Inventors: Sunil Hadap, San Jose, CA (US); Peter Borosan, Somerset, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 260 days.

(21) Appl. No.: 12/956,954

(22) Filed: Nov. 30, 2010

(65) Prior Publication Data

US 2013/0132051 A1    May 23, 2013

Related U.S. Application Data

(60) Provisional application No. 61/384,171, filed on Sep. 17, 2010.

(51) Int. Cl.
*G06G 7/48*    (2006.01)
*G06T 11/20*    (2006.01)
*G06N 99/00*    (2010.01)

(52) U.S. Cl.
USPC ........ 703/6; 703/2; 703/7; 345/441; 345/442; 345/619; 345/647

(58) Field of Classification Search
USPC ....................................................... 345/442
See application file for complete search history.

(56) References Cited

U.S. PATENT DOCUMENTS

| | | | |
|---|---|---|---|
| 5,764,239 A * | 6/1998 | Misue et al. ................. | 345/440 |
| 6,226,405 B1 * | 5/2001 | Furuhata et al. ............. | 382/197 |
| 6,256,039 B1 * | 7/2001 | Krishnamurthy .............. | 345/420 |
| 6,714,901 B1 * | 3/2004 | Cotin et al. ........................ | 703/7 |
| 7,496,416 B2 * | 2/2009 | Ferguson et al. ............... | 700/83 |
| 2002/0180739 A1 * | 12/2002 | Reynolds et al. ............... | 345/474 |
| 2003/0234788 A1 * | 12/2003 | Uesaki et al. .................. | 345/473 |
| 2004/0174363 A1 | 9/2004 | Staples et al. | |
| 2005/0237325 A1 | 10/2005 | Motter et al. | |
| 2006/0055700 A1 * | 3/2006 | Niles et al. ..................... | 345/473 |
| 2006/0192783 A1 * | 8/2006 | Kass et al. ..................... | 345/473 |
| 2008/0150946 A1 | 6/2008 | Kuo | |
| 2009/0237410 A1 | 9/2009 | Baardse et al. | |
| 2012/0232854 A1 * | 9/2012 | Muller-Fischer et al. ........ | 703/1 |

FOREIGN PATENT DOCUMENTS

JP                01125671 A    *    5/1989

* cited by examiner

*Primary Examiner* — Kamini S Shah
*Assistant Examiner* — Jay B Hann
(74) *Attorney, Agent, or Firm* — Wolfe-SBMC

(57) ABSTRACT

A curve editor may model a continuous curve as a finite collection of discrete mass points (among which the curve's mass is distributed) and associated springs. The springs may include damped axial springs between pairs of consecutive mass points, and damped bending springs representing interactions between sets of three consecutive mass points. In response to manipulation of the curve at various mass points, the curve editor may determine new positions and/or velocities of one or more mass points using a real time physical simulation of the spring forces acting at mass points involved in the editing operation. The simulation may be dependent on viscous drag forces and/or on constraints applied to individual mass points, angles defined by consecutive mass points, or an absolute direction of a segment between two mass points. Mass points may be added to or removed from the model by adaptive resampling, and the mass redistributed accordingly.

20 Claims, 17 Drawing Sheets

CURVE EDITING WITH PHYSICAL SIMULATION OF MASS POINTS AND SPRING FORCES

PRIORITY INFORMATION

This application claims benefit of priority of U.S. Provisional Application Ser. No. 61/384,171 entitled "System and Method for Physically-Based Curve Editing" filed Sep. 17, 2010, the content of which is incorporated by reference herein in its entirety.

BACKGROUND

Description of the Related Art

Current techniques for editing curves are typically based on non-physical curve models, such as Bézier curves or NURBS (Non-Uniform Rational B-Splines). These curve models may include anchor points on a given curve and control points that are not on the curve itself, but are outside of and associated with the curve. To edit a curve modeled using anchor points and control points, a user may manipulate one or more of the control points.

Editing by manipulation of such control points is not an intuitive operation for most users, since the control points are not on the curve. Furthermore, curve models based on such control points have no physical basis (i.e. the curve models do not model physical properties associated with manipulation of the curve). Because manipulation of the control points in these curve models does not reflect physical properties of curve editing operations, users may not have an intuitive feel for how changes to the control points affect the curve itself (e.g., its shape) Therefore, the results of editing operations that involve the manipulation of the control points of a curve can be difficult to predict.

SUMMARY

Various embodiments of systems and methods for performing curve editing operations using physical simulations are described herein. In some embodiments, a curve editor may generate a model of a continuous curve that includes a finite collection of discrete mass points (among which the mass of the curve is distributed) and associated springs. For example, the curve editor may be configured to programmatically determine an initial number of mass points in the curve model and an initial position of each of the mass points, e.g., based on the amount of change in the direction of the continuous curve at various points along the curve. In some embodiments, the curve editor may be configured to distribute the mass of the continuous curve (e.g., as defined by the length of the curve, the density of a wire model of the curve, and the area of a cross section of the wire model of the curve) among the mass points in the curve model dependent on the distances between the mass points in the curve model.

In some embodiments, the springs of the curve model may include damped axial springs between pairs of mass points, and/or bending springs representing interactions between sets of three consecutive mass points. In such embodiments, the forces of these springs acting on a given mass point in the model may include one or more of: a linear spring force of an axial spring that attempts to preserve the length of a segment between the given mass point and a neighboring mass point (e.g., a compression or expansion force), a damping force of an axial spring between the given mass point and a neighboring mass point, and/or a bending force that attempts to preserve an angle defined by the given mass point and a neighboring mass point on each side of the given mass point.

In response to receiving data indicating a manipulation of the curve at one or more mass points, the curve editor may determine a new shape of the curve using a real time physical simulation of the spring forces acting on the mass points involved in the curve editing operation (e.g., those mass points that are directly manipulated by the user, and those mass points that are indirectly manipulated due to their connections with directly manipulated mass points). The curve editor may store data representing the continuous curve in its modified shape, in some embodiments. In some embodiments, the curve editor may render the continuous curve in its modified shape and/or display the modified continuous curve. In other embodiments, the curve editor may cause the modified curve to be rendered and/or displayed by another component of the application that includes the curve editor. In some embodiments, performing the physical simulation may include applying a direct solver to a linear system in which the forces acting on each given mass point at the end of a simulation step are approximated by a first order polynomial dependent on the forces acting on the given mass point and the neighboring mass points on each side of the given mass point at the beginning of the simulation step (which are known exactly).

In some embodiments, the physical simulation may be dependent on viscous drag forces acting some or all of the mass points. The physical simulation may in some embodiments be dependent on constraints applied to individual mass points, angles defined by consecutive mass points, or an absolute direction of a segment between two consecutive mass points. For example, the curve editor may include a user interface through which a user may place a constraint on a fixed position of a mass point, a constraint on an angle defined by three consecutive mass points, or a constraint on an absolute direction of a segment between two consecutive mass points.

In some embodiments, the initial mass points in the curve model may be adaptively adjusted and the mass of the curve may be redistributed accordingly. For example, one or more mass points may be added to the model in response to input identifying a position on the continuous curve at which a mass point should be added (e.g., a position on the curve selected by a user as a target of a curve editing operation). In another example, one or more mass points may be added to or removed from the model (and/or the position of one or more mass points may be modified) dependent on the modified shape of the continuous curve resulting from the editing operation. For example, if the new shape of the curve includes more changes in direction in a portion of the curve that was edited than its previous shape, the curve editor may be configured to add one or more additional mass points to the curve model to provide finer granularity for this portion of the curve model. Conversely, if the modified curve includes a portion of the curve that does not require the fine sampling used to model it in its previous shape, the curve editor may be configured to remove one or more mass points from the corresponding portion of the curve model. In some embodiments, the curve editor may include a melting tool option, which, if selected, may cause the modified shape of a continuous curve that has been edited to become the new rest shape of the continuous curve in the curve model.

Figure 1:
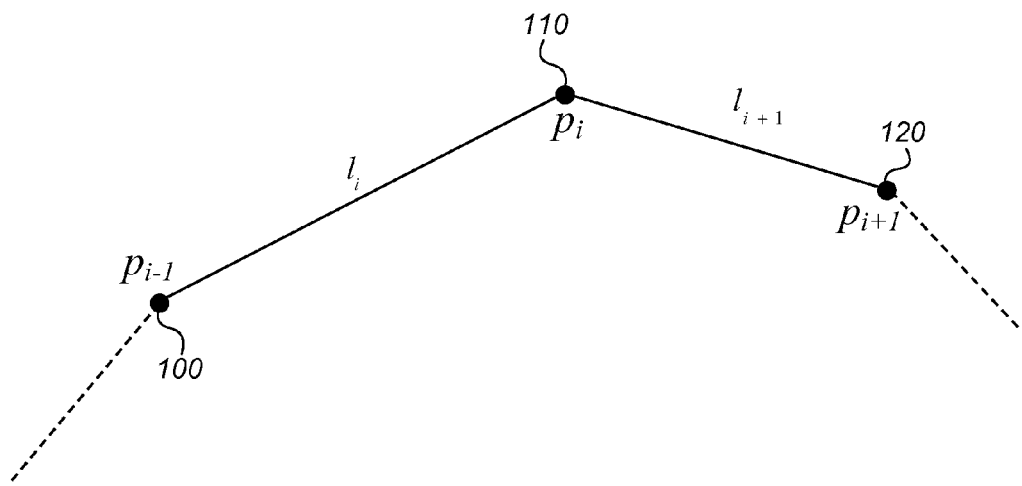
FIG. 1 illustrates a physically based curve model, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of systems and methods for performing physically based curve editing are described herein. Unlike with current curve editing techniques, the methods described herein may model curves in a way that facilitates intuitive editing through direct manipulation of points on the curve model. For example, in some embodiments these curve editing techniques may mimic realistic bending and resistance against stretching when the curves are manipulated. The curve editing systems described herein may allow users to deform existing curves (e.g., in digital artwork) without manually adjusting many degrees of freedom. The framework for this system may be easy to use without much training. In some embodiments, the system may support direct manipulation of curves (or points thereon), the editing process may be highly intuitive, and the editing process may produce predictable results. In some embodiments, the system may employ a real time physical simulation to model the change in the shape of a curve as it is modified by a user through direct manipulation of one or more points on the curve. By using a physical model of the curve and a physical simulation of the movement of points on the curve, the system may guarantee that that interactive manipulation produces results that are similar to those produced by manipulating a real elastic wire.

In some embodiments, a continuous curve may be modeled as if it were an elastic wire that is homogeneous, i.e. as if it were an elastic wire that has a constant cross section, and a constant density for the entire length of the wire. In such embodiments, the mass of a segment of the wire may be proportional to its length. For the physical simulation described herein, a continuous curve may be divided into discrete parts (segments) and may be modeled as a collection of discrete points (referred to herein as mass points) that are the end points of these segments. In such embodiments, the mass of the curve may be concentrated at a finite number of mass points along the curve. For example, the mass concentrated at each mass point may be defined to be half the sum of the masses of the adjacent segments. In other words, the mass of each segment may be distributed equally to its endpoints. Thus, the distribution of the mass to each of the mass points may be dependent on the distances between the mass points in the curve model. In some embodiments, a physically based curve editing module may automatically generate a model of a continuous curve having a finite number of such mass points in response to receiving input defining the continuous curve, or in response to receiving input indicating a modification to be made to the curve (e.g., if a resampling operation is performed in response to a curve modification). In such embodiments, the movement of the curve may be approximated by the movement of these discrete mass points. In some embodiments, as a result of the movement of any of the mass points, the curve editing module may resample the curve (changing the number and/or position of the mass points) and then redistribute the mass of the continuous curve among the mass points in the curve model to reflect changes in the distances between them, i.e. so that the mass at each point is again proportional to the length of the segments on either side of it.

FIG. 1 illustrates a portion of a curve model, according to some embodiments. In this example, the illustrated portion of the curve includes three mass points, labeled as $p_{i-1}$ (100), $p_i$ (110) and $p_{i+1}$ (120). The segments between these points are labeled by their lengths, $l_i$ and $l_{i+1}$. As described above, the mass of each of these points is defined as half the sum of the masses of the adjacent segments. For example, the mass at point $p_i$ (110) may be calculated as $$m_i = \rho A \frac{l_i + l_{i+1}}{2},$$

where $\rho$ represents the curve density (e.g., the density of a wire model of the curve), and A represents the area of a cross section of the curve. Similarly, the mass at point $p_{i-1}$ may be given as $$m_{i-1} = \rho A \frac{l_{i-1} + l_i}{2},$$

and the mass at point $p_{i+1}$ may be given by $$m_{i+1} = \rho A \frac{l_{i+1} + l_{i+2}}{2},$$

where $l_{i+2}$ represents the length of the next segment to the right of point $p_{i-1}$. As noted above, the curve density ($\rho$) and/or cross section (A) of the curve may be constant for a given curve model. As illustrated in this example, the mass at a given point may be linear with respect to the sum of the lengths of the segments on either side of it.

Figure 2A:
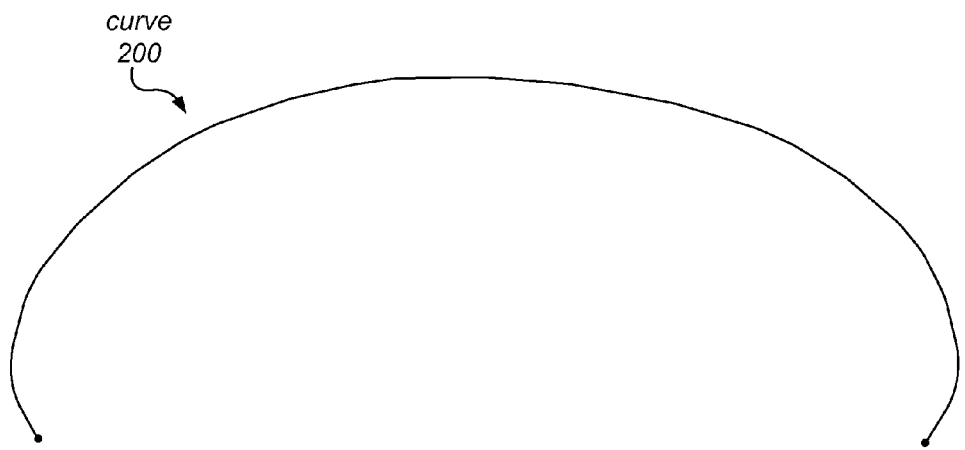
FIG. 2A illustrates an input curve, according to some embodiments.
Figure 2B:
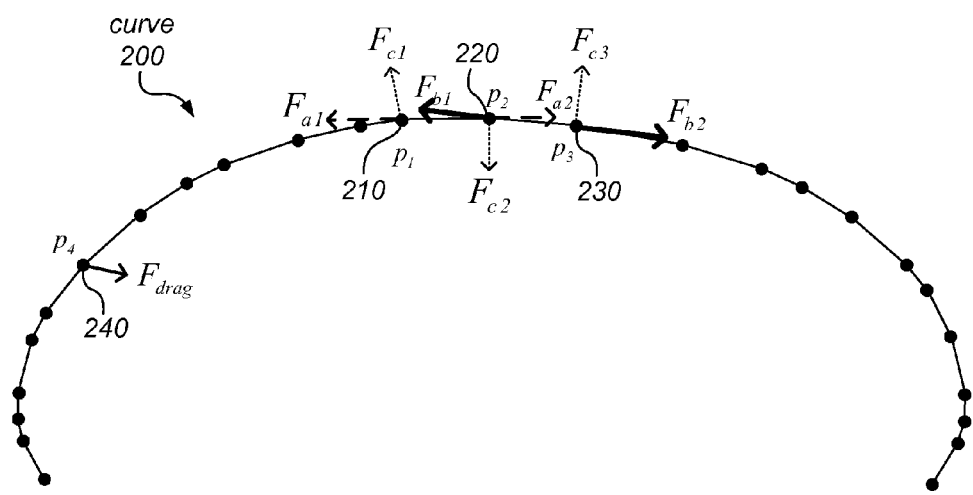
FIG. 2B illustrates a model of the input curve in FIG. 2A, according to some embodiments.

In some embodiments, the internal forces of the elastic wire representation of a curve may be modeled as damped axial and bending springs between the mass points. For example, these internal forces may be modeled by damped axial springs that connect each pair of consecutive mass points, and by damped bending springs that express the forces resulting from the interaction of each set of three consecutive mass points, (i.e. each given point and the mass points on either side of the given point). In some embodiments, to make the simulation more realistic and also more stable, the mass points may also be exposed to viscous drag forces. In other words, the simulation may include viscous drag forces at one or more of the mass points. FIG. 2A illustrates a continuous curve (i.e. an input curve on which various forces are acting), while FIG. 2B illustrates a discrete model of this curve, e.g., as generated by a physically based curve editing module. In this example, the curve is currently being edited (i.e. one or more editing operations have already been applied to the curve), and its rest shape is a straight line. The curve model illustrated in FIG. 2B includes a number of mass points, including the mass points labeled as $p_1$ (210), $p_2$ (220), $p_3$ (230), and $p_4$ (240).

FIG. 2B also illustrates some of the forces acting on the mass points, according to various embodiments. In this example, $F_{drag}$ represents a viscous drag force on one of the mass points, $p_4$ (240); $F_{a1}$ and $F_{a2}$ represent forces of an axial spring between points $p_1$ (210) and $p_2$ (220) having the same magnitude, but opposite direction (i.e. in directions extending the line segment between these two points, and thus parallel to the line segment between these two points); and $F_{b1}$ and $F_{b2}$ represent forces of an axial spring between points $p_2$ (220) and $p_3$ (230) having the same magnitude, but opposite direction (i.e. in directions extending the line segment between these two points, and thus parallel to the line segment between these two points). As discussed in more detail below, these axial spring forces may have two components.

As described herein, the curve model may in some embodiments include bending springs that represent the interactions between consecutive mass points. For example, the bending spring force at point $p_2$ due to the bending spring modeling the bending forces between points $p_1$, $p_2$, and $p_3$ (shown in FIG. 2B as $F_{c2}$) may be dependent on the positions of points $p_1$ and $p_3$. In other words, it may be dependent on the bending spring forces at points $p_1$ and $p_3$ due to the bending spring modeling the bending forces between these three points. Note that there may be other bending spring forces at points $p_1$, $p_2$, and $p_3$ due to bending springs defined by other point triplets that include these points (not shown in FIG. 2B).

Note that in the figures described herein, the lengths of the arrows representing various forces acting on the curve may indicate the absolute magnitudes of those forces or the magnitudes of those forces relative to other forces depicted in the same figure. In this example, the force shown as $F_{c2}$ is equal to the sum of portions of the bending spring forces at points $p_1$ and $p_3$. More specifically, the force shown in FIG. 2B as $F_{c2}$ is equal to the inverse of the sum of the forces $F_{c1}$ and $F_{c3}$, in this example. Therefore, the sum of these three bending forces is zero. Note that the direction of force $F_{c1}$ may be perpendicular to the segment between $p_1$ and $p_2$, and the direction of force $F_{c3}$ may be perpendicular to the segment between $p_2$ and $p_3$, in this example.

In some embodiments, the axial springs of the curve model may act between neighboring mass points, and the direction of the force may be parallel to the line connecting the neighboring points. One part of the force of an axial spring may be proportional to the change in the distance between these points due to manipulation of the curve, and this portion of the axial spring force may try to preserve the original distance between the points (i.e. the rest length of the spring). For example, in some embodiments this portion of the axial spring force may be computed as follows:

$$F_{i-1} = -k_i(\|p_{i-1} - p_i\| - l_i^0)\frac{p_{i-1} - p_i}{\|p_{i-1} - p_i\|} = -F_i$$

Figure 3A:
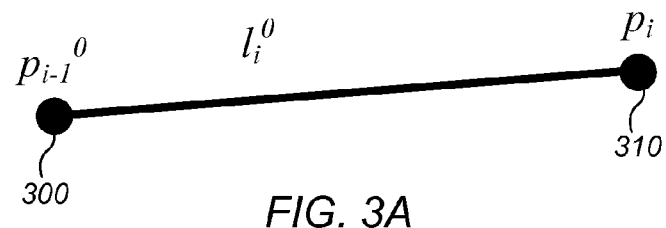
FIGS. 3A-3B illustrate one portion of the force of an axial spring due to a curve editing operation, according to some embodiments.
Figure 3B:
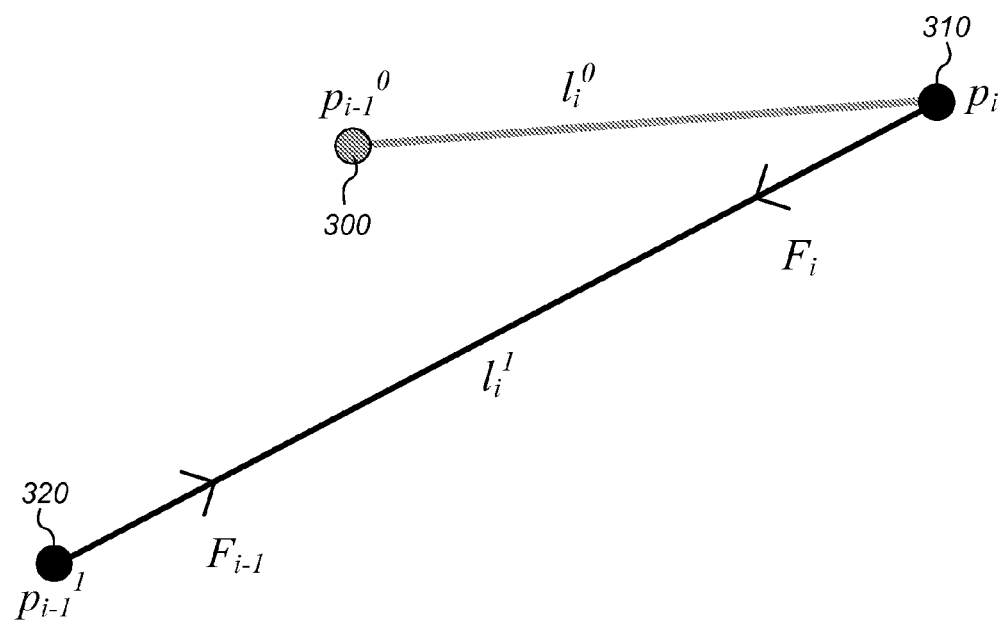

In this equation, the force is a product of three coefficients. One is $k_i$, which is a non-negative spring constant. Another is the signed change in the length of the spring. Note that these first two (scalar) quantities specify the magnitude of the force. The third coefficient is a unit vector pointing from the $i^{th}$ point towards the $i-1^{th}$ point. This coefficient specifies the direction of the force. In various embodiments, the $k_i$ spring constant may be defined by $$k_i = \frac{Ea}{l_i^0}$$

where A is again the cross section of the curve, $l_i^0$ is the rest length of the segment (i.e. the spring between the two points), and E is the Young's modulus of the material of the real elastic wire, which may be specified by the user, or may be set to a default value. According to the equation above, the spring constant of a spring is inversely proportional to its rest length. This distance-preserving portion of an axial spring force is illustrated in FIGS. 3A-3B, according to one embodiment. In this example, a portion of a curve modeled as mass points connected by springs has been moved (and stretched) from its original position and length to a new position and length. The original portion of the curve (at time 0) is shown in FIG. 3A, and includes mass points $p_{i-1}^0$ (300) and $p_i$ (310). The portion of the curve between them (which may be modeled by connecting springs) is illustrated in FIG. 3A as a segment of length $l_i^0$.

FIG. 3B illustrates the same portion of the curve illustrated in FIG. 3A after the mass point at $p_{i-1}^0$ (300) has been moved to a new position at time 1, shown as $p_{i-1}^1$ (320), thus stretching the segment between $p_{i-1}^1$ (320) and $p_i$ (310) to a new length, $l_i^1$. The original position of this portion of the curve is illustrated in FIG. 3B as the light grey segment between point $p_{i-1}^0$ (300) and point $p_i$ (310), and the modified version of this portion of the curve is shown in FIG. 3B as the solid black segment between points $p_{i-1}^1$ (320) and $p_i$ (310). In this example, the curve is modeled using axial springs between pairs of mass points. One portion of the force of these springs is illustrated in FIG. 3B as the axial spring forces $F_{i-1}$ and $F_i$ (which have equal magnitude, but opposite direction). As described herein, these axial forces may attempt to preserve the original rest length of the axial spring between $p_i$ and $p_0$ (e.g., by compressing the spring). These compression forces are represented in FIG. 3B by the arrows along the segment connecting points $p_{i-1}$ and $p_i$. In this example, these forces may be attempting to return the length of the segment connecting points $p_{i-1}$ and $p_i$ (which now has a length of $l_i^1$) to its original length of $l_i^0$. Note that in some embodiments, if a curve editing operation shortens or compresses a segment of the curve, the axial spring forces may attempt to return the segment to its rest length by stretching it (e.g., using an expansion force).

In some embodiments, another part of the force of an axial spring (i.e. a damping portion of the spring force) may be proportional to the difference in the velocity of the two mass points that are connected by the axial spring, as projected on the line connecting them. For example, if a user selects a mass point on a curve and drags it to a new position with a particular velocity, the other mass points of the curve may try to follow the dragged point at the same velocity. In some embodiments, if a user manipulates a given mass point, this may generate a velocity impulse at that mass point, and from that impulse, some velocity may be generated at other mass points (e.g., those connected to the given mass point by springs). In some embodiments, the actual velocity of these additional mass points may be dependent, at least in part, on the velocity of the dragged point. In response to manipulation of the curve, a damping portion of the axial spring forces may try to keep the velocities of the dragged point and any "following" points equal in the direction in which the dragged point was moved. In some embodiments, this damping portion of the axial spring force may be computed as follows:

$$F_{i-1}^d = -k_i^d \frac{p_{i-1} - p_i(p_{i-1} - p_i)^T}{\|p_{i-1} - p_i\|\|p_{i-1} - p_i\|}(v_{i-1} - v_i) = -F_i^d.$$

In this equation, the first coefficient $k_i^d$ is the damping constant. In some embodiments, to minimize oscillations (i.e. in order to return the spring to the equilibrium state quickly), the system may apply critical damping, which, as known from signal theory, to compute the damping factor as follows:

$$k_i^d = 2\sqrt{\frac{k_i}{\frac{1}{m_{i-1}} + \frac{1}{m_i}}}.$$

Here, m denotes the mass of the given mass point. Note that in the equation for the damping force above, the second coefficient is the same as the third coefficient in the previous axial spring force equation, and it specifies the direction of the force. In this damping force equation, the third coefficient is the transpose of a unit vector in the direction of the line connecting the mass points. The forth coefficient is the velocity difference of the end points. Therefore, the product of the third and forth coefficients is a scalar product, and it represents the signed length of the projection of the velocity difference onto the line connecting the mass points. This is illustrated in FIG. 4 as the length of the line connecting the mass points 470 and 440, as described below.

Figure 4:
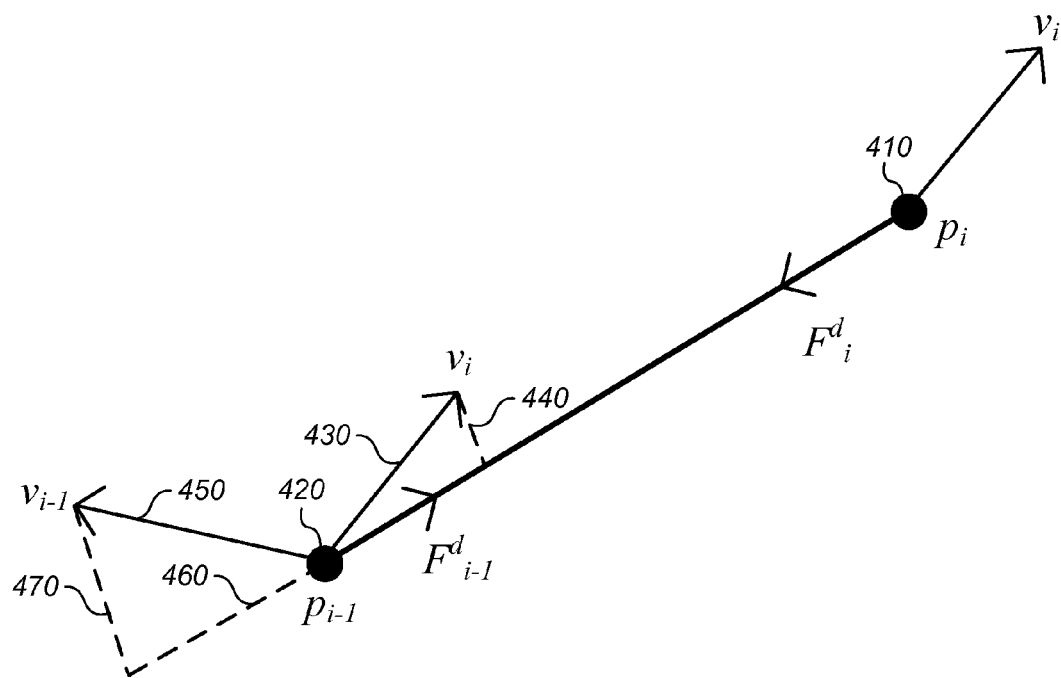
FIG. 4 illustrates a damping portion of the force of an axial spring due to a curve editing operation, according to some embodiments.

The damping portion of the axial spring shown in FIG. 3 is illustrated in FIG. 4, according to one embodiment. In this example, the damping forces $F_i^d$ and $F_{i-1}^d$ shown along the segment connecting points $p_{i-1}$ (420) and $p_i$ (410) are proportional to the velocity difference of the points $p_i$ (410) and $p_{i-1}$ (420), i.e. the difference between velocity $v_i$ 430 (the velocity of the movement of the point $p_i$ (410) as translated to point $p_{i-1}$ (420)) and $v_{i-1}$ 450 (the velocity of point $p_{i-1}$ (420)), as projected on the connecting segment. For example, dashed segment 440 is orthogonal to the line connecting $p_{i-1}$ (420) and $p_i$ (410), and illustrates the projection of the velocity $v_i$ (430) onto the line connecting the two mass points. Dashed segment 470 is similar to dashed line 440, but illustrates the projection of the velocity $v_{i-1}$ (450) to the line connecting the two mass points. In this example, the damping force of the axial spring between the two mass points is proportional to the distance between dashed segments 470 and 440. Note that dashed segment 460 represents the continuation of the line connecting the two mass points so that the projection of 450 onto the line connecting the two mass points is visible. These damping forces, along with any additional viscous drag forces included in the simulation, may in some embodiments prevent continuous movement of one or more mass points (including slowing down oscillations) as a result of a manipulation of the curve.

In one example, if a mass point is dragged to a new position such that it gets near enough to its neighbor (e.g., nearer than the equilibrium point), the axial spring between the point and its neighbor in the curve model may be compressed, and a portion of the axial spring forces may attempt to return the mass point and the connecting spring to their original positions. In some cases, this could cause oscillations. In some embodiments, the damping portion of the axial spring force may act in the opposite direction to slow down such oscillations. Note that if the velocities of the two mass points defining a segment are equal, the damping force will also be zero. Note also that if the mass points of a curve are manipulated such that the length of a segment between two mass points does not change (e.g., if a segment is rotated about a mass point and/or its position is translated without changing its length), there may be no damping forces even if the spring is stretched or compressed because the axial component of the velocity difference will be zero.

In some embodiments, the bending springs of the curve model may act on three consecutive mass points, and may attempt to preserve the original angle defined by these points. The behavior of the bending spring forces may be similar to that of the linear spring forces. In some embodiments, the torque exerted by a bending spring may be proportional to the angular displacement. The forces acting on the side points in the set of three points may be perpendicular to the lines drawn between these point and the middle point of the three points, and the magnitude of each of these forces may be inversely proportional to the distance from this mid-point to the corresponding side point. For example, in some embodiments the torque may be given by:

$$\tau_i = \kappa \Theta_i.$$

In this equation, $\kappa$ is the bending spring constant Note that while the spring constant for the axial springs depends on the rest length of the spring, the bending spring constant is the same for all of the bending springs, and depends only on the material to be modeled. In various embodiments, this constant may be specified by the user, or a default value may be used. In this equations, $\Theta_i$ is the angular displacement. This is shown in FIG. 5 as: $\Theta_i = \Theta^*_i - \Theta_i^0$. Note that these angles are handled as vectors (following the right hand rule).

As noted above, bending springs may also contribute a damping force. For example, in some embodiments the damping torque may be given by:

$$\tau_i^d = -\kappa_i^d (\omega_{i-1} - \omega^{i+1})$$

In this equation, $\kappa_i^d$ is the damping constant. In this case, similar to the case above, the critical damping may be achieved by setting this to $$\kappa_i^d = 2 \sqrt{\frac{\kappa}{\frac{1}{I_{i-1}} + \frac{1}{I_{i+1}}}}.$$

Here, I is the moment of inertia of the side points relative to the center point: $I_{i-1} = m_{i-1} \|p_{i-1} - p_i\|^2$ (which represents the mass times the squared distance from the axis of rotation). In this equation, the second coefficient is the difference of the angular velocities, where the angular velocity is given by:

$$\omega_{i-1} = \frac{p_{i+1} - p_i}{\|p_{i+1} - p_i\|^2} \times (v_{i-1} - v_i).$$

Given these torques, the forces coming from this bending spring can be computed as:

$$F_{i-1} = (\tau_i + \tau_i^d) \times \frac{p_{i-1} - p_i}{\|p_{i-1} - p_i\|^2},$$

$$F_{i+1} = -(\tau_i + \tau_i^d) \times \frac{p_{i+1} - p_i}{\|p_{i+1} - p_i\|^2},$$

$$F_i = -(F_{i-1} + F_{i+1}).$$

As previously noted, the direction of the force at each point is orthogonal to the segment, and the magnitude is inversely proportional to the distance. Note also that the forces coming from a single bending spring may add up to zero.

Figure 5A:
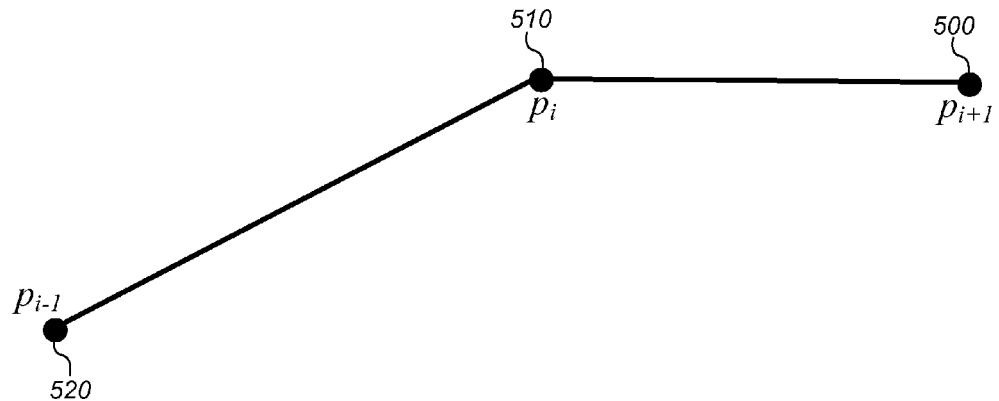
FIGS. 5A-5B illustrate bending spring forces due to a curve editing operation, according to some embodiments.
Figure 5B:
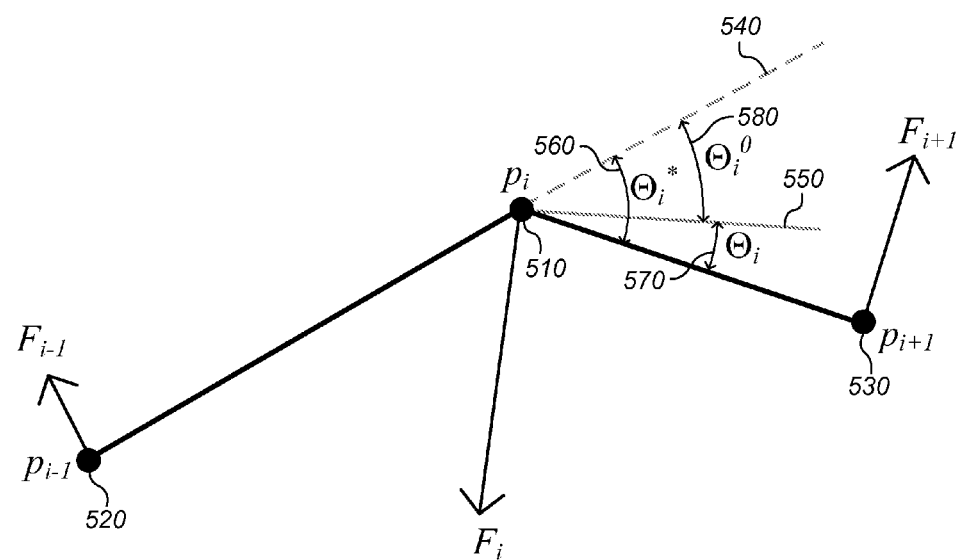

Bending spring forces are illustrated in FIGS. 5A-5B, according to one embodiment. In this example, FIG. 5A illustrates a portion of a curve modeled by mass points $p_{i-1}$ (520), $p_i$ (510), and $p_{i+1}$ (500), and associated springs, prior to a curve editing operation in which mass point $p_{i+1}$ is moved to a new position. In other words, FIG. 5A illustrates the rest shape of a curve defined by these three points. FIG. 5B illustrates the same portion of the curve after point $p_{i+1}$ was moved to its new position (shown in FIG. 5B as 530). In FIG. 5B, the dashed gray line labeled 540 represents the continuation of the line from point $p_{i-1}$ (520) to point $p_i$ (510) and the solid gray line labeled as 550 represents the rest shape of the segment between points $p_i$ (510) and $p_{i+1}$ (530).

In this example, bending spring forces $F_{i-1}, F_i, F_{i+1}$ may act on points $p_{i-1}, p_i$ and $p_{i-1}$ to attempt to preserve the original angle defined by these points (i.e. the angle illustrated in FIG. 5A). In this example, $\Theta_i^0$ (580) represents the original bending angle, $\Theta^*_i$ (560) represents the bending angle after manipulation of the curve, $\Theta_i$ (570) represents the angular displacement due to the manipulation of the curve, and, as noted above, the bending force (i.e. the torque) on the mass points is proportional to this angle. Note that the bending force is greater for a shorter segment than for a longer segment. This is illustrated in FIG. 5, in which the magnitude of $F_{i-1}$ is smaller than the magnitude of $F_{i+1}$. As noted above, the bending forces for the side points in a set of three mass points (in this case, $p_{i-1}$ and $p_{i-1}$) may be perpendicular to the segments drawn between these side points and the mid-point of the set of three (in this case, $p_i$). The direction and magnitude of the force at this mid-point may be equal to the inverse of the sum of the forces on the side points, so that the sum of the three forces associated with the bending spring is zero.

As noted above, the simulation may in some embodiments include viscous drag forces, which may act on individual mass points. In such embodiments, the magnitude of these forces may be proportional to the absolute velocities of the points due to manipulation of the curve, but their directions may be opposite. In some embodiments, the viscous drag force for each mass points has a magnitude proportional to that of the velocity of the mass point, and opposite direction, as follows:

$$F_i^{drag} = -k_{drag} v_i.$$

In this equation, F and v are the force and the velocity vectors, respectively, and k is a non-negative scalar constant that may be specified by the user (or even changed during the editing process), or may be a default value, in different embodiments.

Figure 6:
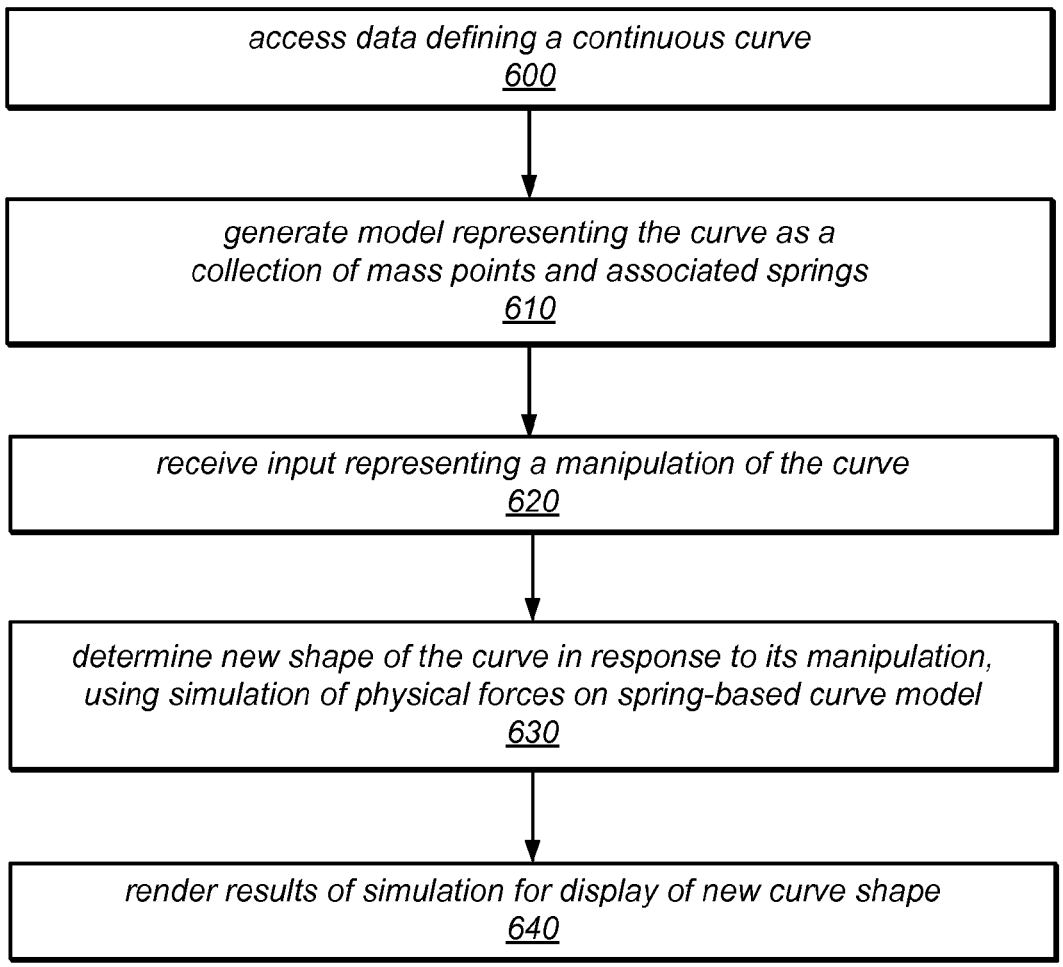
FIG. 6 is a flow diagram illustrating a method for using a physically based simulation to perform curve editing operations, according to one embodiment.

In some embodiments, given a model that reflects the configuration of a curve (e.g., a curve model that indicates the positions and velocities of the mass points of the curve), and (in some cases) any user constraints that have been applied to the model or placed on a curve manipulation, the physically based curve editing module described herein may be used to determine the configuration of the curve at a later time (e.g., following the manipulation of the curve or at an intermediate simulation time step). FIG. 6 illustrates one embodiment of a method for using a physically based simulation to perform curve editing operations. As illustrated at 600, the method may include a physically based curve editing module (sometimes referred to herein as a curve editor) accessing data that defines a continuous curve. For example, in various embodiments, the curve editor may receive or obtain data representing a curve from data representing a digital image (e.g., digital artwork) that is stored in memory and/or that has been loaded from memory as input to an image editing application. In some embodiments the curve editor may access data representing a curve in response to a user selecting the curve in a portion of a digital image being edited using such an application. For example, the user may employ a selection tool of a graphical user interface (GUI) to select a curve on which to perform a curve editing operation. The curve editor may generate a model representing the curve (or a portion of the curve on which an editing operation is to be performed) as a collection of mass points and associated springs, as in 610. For example, for a curve (or a portion thereof) selected by a user to be a target of a curve editing operation, the curve editor may generate a curve model that includes damped axial springs between pairs of mass points and damped bending springs representing interactions between triplets of consecutive mass points, as described above.

As illustrated at 620 in FIG. 6, the curve editor may receive input representing a manipulation of the curve. For example, in some embodiments the curve editor may receive input from a GUI indicating that a user has selected (e.g., "grabbed") a mass point and dragged it to a new position such that the curve (or a portion thereof) is stretched, compressed, and/or reshaped. In other embodiments, the input may indicate that the user selected a point on the curve for which there is not a corresponding mass point in the curve model. In either case, in response to the manipulation of the curve, the curve editor may determine a new shape of the curve (or the affected portion thereof), using a simulation of physical forces on the spring-based curve model, as in 630. Such physical simulations are described in more detail below, according to various embodiments. In some embodiments, the curve editor may then render the results of the simulation for display of the new curve shape, as in 640. Note that in some embodiments the curve editor may be configured to render results after each editing operation or after each simulation time step thereof, and/or to display results of these editing operations (e.g., the new curve shape) in real time as the user interacts with the image and/or any curves thereof.

Note that in some embodiments, rendering the results of a curve editing operation may be performed by a module other than the curve editor (e.g., another module of a graphics program that includes the curve editor). Note also that in some embodiments, a different representation of the curve may be used in rendering the results of curve editing operations than that used in simulating curve editing operations.

For example, while the linear curve model described above may be used in physically based curve editing, a different representation of the curve may be used in rendering the results of curve editing operations. In some embodiments, the modified curve may be rendered using Bézier curves, Catmull-Rom splines, or any of a variety of suitable techniques for presenting graphical images that include curves to the user. In some embodiments, the results of a curve editing operation may be rendered by a graphics processing unit (GPU) using any suitable method for rendering curves in real time. Note also that the segmentation used in a Bézier curve or Catmull-Rom spline representation for rendering the resulting curve may be different than the segmentation used when simulating the changes in shape of the curve during physically based curve editing (e.g., the segmentation for rendering may in some embodiments be finer than that necessary to implement the physically based curve editing techniques described herein).

In some embodiments, in addition to, or instead of, rendering the results of the physical simulation, the curve editor may store the results for subsequent use. For example, in some embodiments data representing the modified curve (or the modified portion of the curve) may be stored as a curve model that includes a collection of mass points and associated springs as modified by the curve editing operation. In such embodiments, this modified curve model may be accessed when applying additional curve editing operations to the continuous curve. In other embodiments, data representing the modified curve may be stored in another format, e.g., one that is better suited for rendering the curve (or the digital image of which it is an element) or for performing other types of image editing operations (e.g., scaling, filtering, or object manipulation operations). For example, a curve representation having a finer granularity than one suitable for curve editing operations may be more appropriate for other operations (such as for realistic rendering), while this finer granularity may be impractical for real time curve editing.

In some embodiments, the curve editing module may be configured to solve a system of differential equations. In some such embodiments, the curve editing module may approximate integrals using a backward differentiation formula. In other words, it may approximate the function value over the integral by the function value at the end point of the integral. To obtain the force at the end of the time step, the curve editing module may in some embodiments approximate the force as a function of the curve configuration, e.g., by its first order Taylor-series expansion. In this way, the curve editing module may solve a system of linear equations. Note that as a result of the connectivity of the mass points in the curve model, the forces acting on a particular mass point may only depend on the properties of mass points near the particular mass point (e.g., its two nearest neighbors on each side). Therefore the system matrix may be a block band diagonal, and the linear system may be solved very efficiently using a direct solver. In some embodiments, the linear system may include one equation for each mass point in each coordinate axis direction. For example, to simulate a curve editing operation on a curve modeled using n mass points, the linear system may include 2n equations (assuming a 2D simulation). For a 3D simulation, the linear system may include 3n equations.

The physical simulation performed by a curve editing module is further described by way of the following detailed example, according to one embodiment. In this example, the velocity is the derivative of the position, as follows:

$$v_i = \frac{d}{dt}p_i, \text{ or (equivalently):} \int_t^{t+\Delta t} v_i \, dt = \Delta p_i.$$

In this example, t represents time. The connection between the forces and the change in velocity is given by Newton's second law, as follows:

$$F_i = m_i \frac{d}{dt}v_i, \text{ or (equivalently):} \int_t^{t+\Delta t} F_i \, dt = m_i \Delta v_i.$$

In this example, approximating integrals using backward differentiation means that these integrals are approximated as follows:

$$\Delta p_i \approx v_i(t+\Delta t)\Delta t = (v_i(t)+\Delta v_i)\Delta t \text{ and}$$

$$m_i \Delta v_i \approx F_i(t+\Delta t)\Delta t.$$

In this example, however, $F_i(t+\Delta t)$ is unknown. Therefore, $F_i(t+\Delta t)$ is approximated by a first order Taylor-series expansion, as follows:

$$F_i(t+\Delta t) = F_i(p(t+\Delta t), v(t+\Delta t))$$
$$= F_i(p(t)+\Delta p, v(t)+\Delta v)$$
$$\approx F_i(t) + \frac{\partial F_i}{\partial p}(t)\Delta p + \frac{\partial F_i}{\partial v}(t)\Delta v.$$

In this example, p is a vector containing all the coordinates of all the points $p=(p_1^x \, p_1^y \ldots p_n^x \, p_n^y)^T$ and v is a vector containing all the coordinates of all the velocity vectors $v=(v_1^x \, v_1^y \ldots v_n^x \, v_n^y)^T$.

The equation above may be generated for all the mass points. With the only unknowns being the velocity changes, these equations may be rearranged, resulting in the following system of linear equations:

$$A\Delta v = b, \text{ where}$$

$$A = \begin{pmatrix} m_1 & 0 & \cdots & 0 & 0 \\ 0 & m_1 & \cdots & 0 & 0 \\ \vdots & \vdots & \ddots & \vdots & \vdots \\ 0 & 0 & \cdots & m_n & 0 \\ 0 & 0 & \cdots & 0 & m_n \end{pmatrix} - \frac{\partial F}{\partial p}(t)\Delta t^2 - \frac{\partial F}{\partial v}(t)\Delta t.$$

In these equations, F is the vector containing all the coordinates of all the force vectors, $$b = F(t)\Delta t + \frac{\partial F}{\partial p}(t)v(t)\Delta t^2,$$

and $\Delta t$ is the length of the time step used for the simulation.

As noted above, the force at a given mass point may only depend on the properties of the two nearest neighbors for forces coming from axial springs, the properties of the 4 nearest neighbors for forces coming from bending springs, and a viscous drag force dependent only on its own velocity for. Therefore: If $$|i-j|\rangle 2, \frac{\delta F_i}{\delta v_j} = \frac{\delta F_i}{\delta p_j} = 0,$$

and the Jacobian matrices described above $$\left(\frac{\partial F}{\partial v}, \text{ and } \frac{\partial F}{\partial p}\right)$$

will be block band diagonal. Therefore the system matrix (A) may be a block band diagonal, and the linear system may be solved very efficiently using a direct solver.

Figure 7:
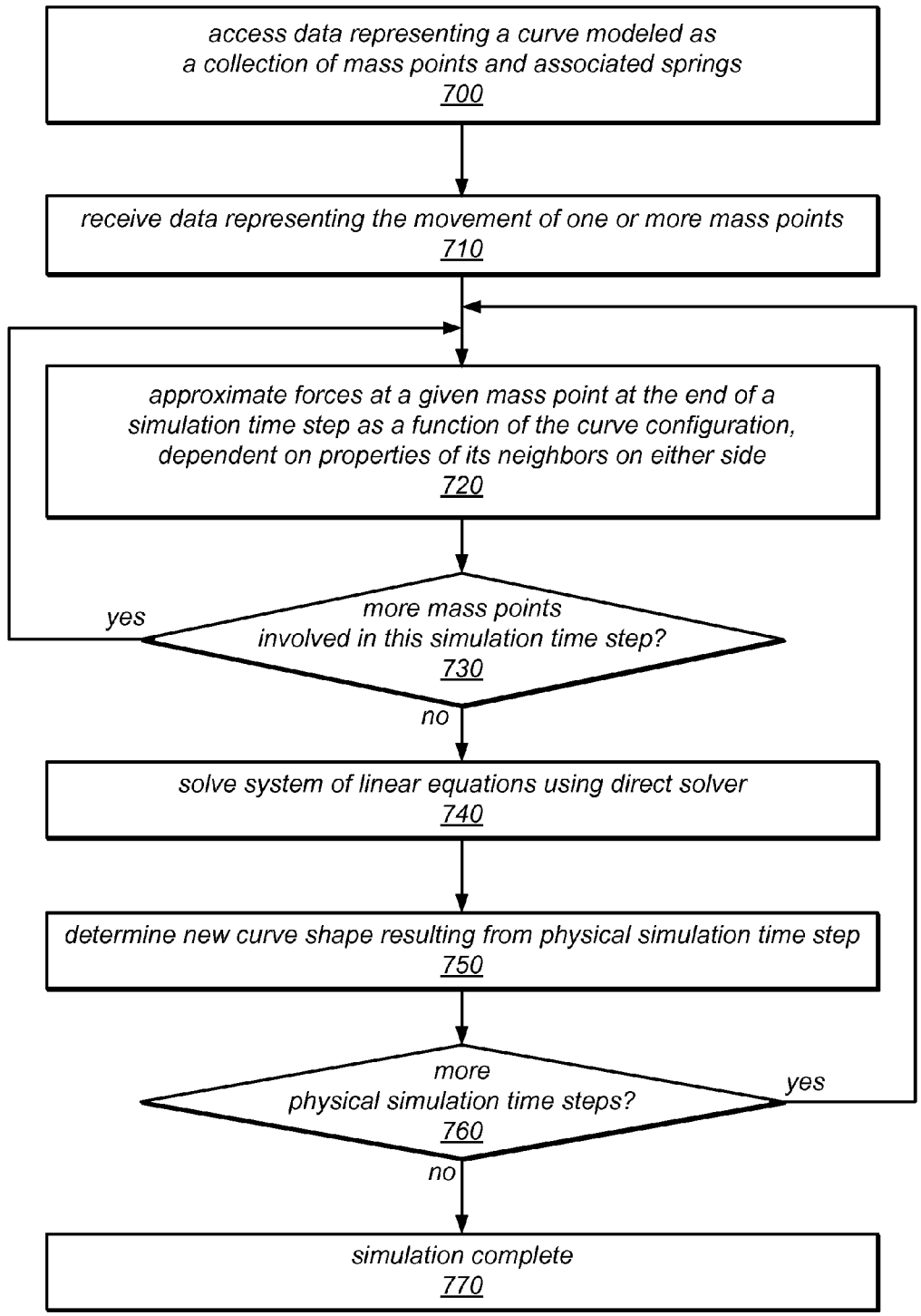
FIG. 7 is a flow diagram illustrating a method for performing a physically based simulation of a curve editing operation, according to one embodiment.

FIG. 7 illustrates one embodiment of a method for performing curve editing using a physically based simulation of a curve that has been modeled in the manner described herein. As illustrated at 700, the method may include a curve editor accessing data representing a curve modeled as a collection of mass points and associated springs (e.g., damped axial springs between each pair of mass points, and damped bending springs expressing interactions between triplets of consecutive mass points). As noted above, the curve editor may obtain curve data that is stored in memory (e.g., from data representing a curve that has not yet been edited or data resulting from a previous editing operation), that has been loaded from memory as input to an image editing application, and/or that has been selected by a user to be a target of a curve editing operation. As illustrated at 710, the method may include receiving data representing the movement of one or more mass points of the curve. For example, if a user manipulates the curve by selecting (grabbing) one of the mass points and moving (dragging) it to a new location, the curve editor may receive data indicating the movement of the selected mass point from one position to another. In some embodiments, the curve editor may receive data indicating the velocity with which the selected mass point was moved to the new position. The curve editor may also receive (or may calculate) information about the velocity at which mass points connected to the selected mass point are moved as a result of this editing operation, in various embodiments. Note that in some embodiments, each simulation time step may correspond to a complete editing operation (e.g., the movement of one mass point to a different position by a single mouse down/up gesture or other cursor control gesture may be considered to have happened during a single time step), while in other embodiments, a single editing operation may be simulated over multiple time steps (e.g., the new shape of the curve may be simulated in real time for each of multiple increments of time as the curve editing gesture is performed).

As illustrated at 720, the simulation may include the curve editor approximating the forces at a given mass point (e.g., the one that was selected and dragged) at the end of a simulation time step as a function of the curve configuration, dependent on properties of the four mass points that are its nearest neighbors on either side, i.e. two mass points on each side of the given mass point. For example, the force due to a bending spring centered at a given mass point's nearest neighbor may also depend on the neighbor's neighbor. In some embodiments, the curve editor may approximate the forces (e.g., compression, expansion, damping, bending, and/or drag forces) at a given mass point at the end of the time step using a first order Taylor series expansion. In other words, the physical simulation may be used to generate the equations of motion at the given mass point, such that solving for the post-edit position of the given mass point (and that of any other mass points involved in the curve editing operation) results in a balance of forces at the given mass point and the other mass points involved in the operation. If there are more mass points involved in this simulation time step, shown as the positive exit from 730, the method may include approximating the forces at other mass points, shown as the feedback from 730 to 720. For example, the curve editor may approximate the forces at mass points that are dragged along with a directly manipulated mass point, or mass points about which a segment of the curve has been rotated, but may not need to take into account any forces at mass points far from the mass points targeted by the curve editing operation, or those to which certain constraints have been applied.

Once all of the forces have been approximated for the mass points involved in the simulation time step, shown as the negative exit from 730, the method may include the curve editor solving the resulting system of linear equations using a direct solver, as in 740. As illustrated at 750, the method may include the curve editor determining the new shape of the curve resulting from this simulation time step. For example, solving for the effects of the spring forces may yield new position values and new velocity values for each of the mass points involved in the simulation step, including mass points that were directly manipulated by a user, and mass points whose new positions and/or velocities were indirectly affected due to their connections with directly manipulated mass points and other followers. If there are more physical simulation time steps to be processed in the curve editing simulation (e.g., for the input received at 710), shown as the positive exit from 760, the method may include repeating the operations shown at 720-750 for each of the additional time steps. This is illustrated in FIG. 7 by the feedback from 760 to 720. If there are more curve editing operations to simulate during an image editing session, the operations illustrated at 710-750 may be repeated, as necessary (not shown). If there are no more physical simulation time steps to process (or once all of the simulation time steps have been processed), shown as the negative exit from 760, the simulation may be complete, as in 770.

Note that in various embodiments, the results of the physical simulation may include new configurations for various mass points that are involved in a curve editing operation, which may include new positions and/or new velocities for those mass points. The forces computed as part of the simulation may not be stored, but may be computed before each simulation step based on the positions and velocities of the mass points. Also note that after some (or all) simulation steps, a resampling operation may occur, in which points may be added to or removed from the model of the curve. Therefore, the output of the simulation at this stage may also include a new sampling of the curve. Since the number of mass points may change due to the resampling, the number of axial springs (along with all their parameter values, such as the spring constant, damping constant, and/or rest length) and/or bending springs (along with all their parameters) may also change. Note also that after the simulator module builds a linear system based on the constraints coming from the user interface (e.g., computing the S matrix), and computes the forces based on the positions and velocities, a linear solver module may solve the system. Based on the solution, the simulator may update the positions and velocities of the affected mass points, and then may perform a resampling step, as described herein.

In some embodiments, the physical simulation described herein may need to balance two contradicting requirements. For example, a faithful simulation may require fine sampling of the curve, especially in high curvature regions. On the other hand, if the system is to perform curve editing simulations in real time, this may limit the total number of mass points that can be handled at one time. In other words, the physical simulator may not be able to simulate the editing of curves having an arbitrarily large number of mass points in real time. Therefore, in some embodiments, the system may be configured to adaptively re-sample the curve, and to use finer sampling only where and when it is necessary for the faithful simulation (e.g., only in a portion of the curve with many changes in direction and/or only in a portion of the curve that is currently being edited). Note that in addition to the system adaptively adding mass points in some areas, it may be configured to adaptively remove mass points as well (e.g., when the new shape of the curve following a curve editing operation is one that does not require the fine sampling used to model the curve in its previous shape). In various embodiments, there may be different reasons why the sampling in a region of the continuous curve may not be satisfactory and may be re-sampled. For example, if the initial discrete model does not approximate the shape of the original continuous curve or the modified continuous curve well enough, or if the number of degrees of freedom of the curve model is too low to faithfully simulate the dynamics of the continuous curve, the curve editor may be configured to adaptively re-sample the curve (e.g., automatically, or in response to user input to invoke a re-sampling of the curve).

Figure 8A:
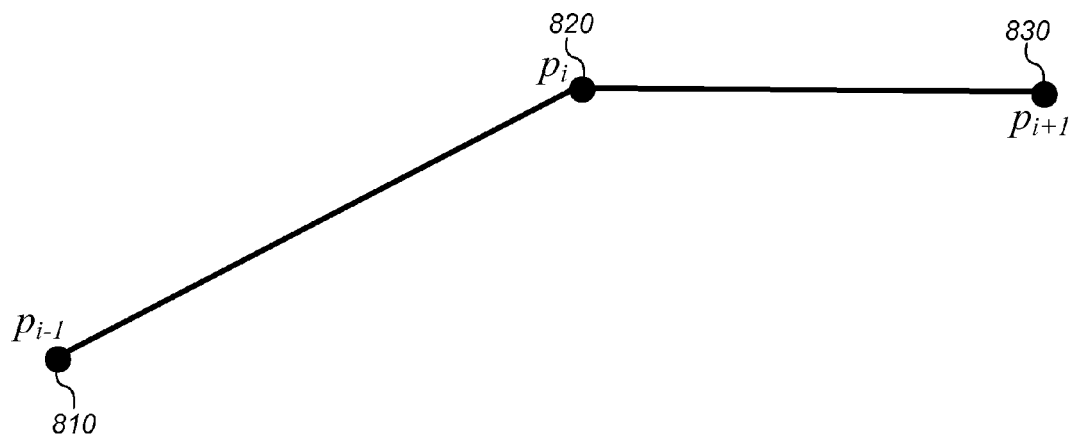
FIGS. 8A-8B illustrate the use of a heuristic in approximating the sampling error due to a curve editing operation, according to some embodiments.
Figure 8B:
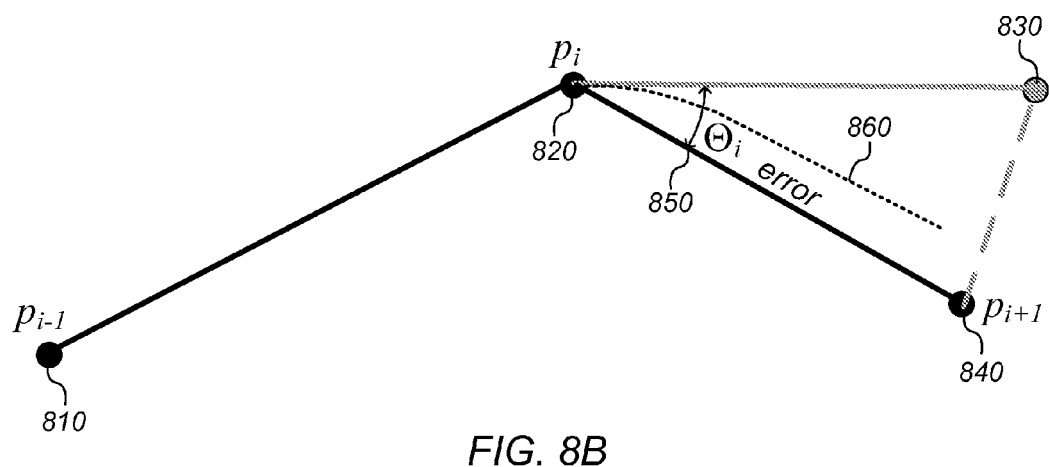

In some embodiments, a heuristic metric may be used to approximate the sampling error of the curve model. For example, in some embodiments, if the angle defined by a set of mass points has changed at the end of a simulation step (as a result of the manipulation of the curve), the area of a triangle defined by the original segment between a point and its neighbor and the new segment between the point and its neighbor (which has moved) may be used as an approximation of the sampling error. In this example, when the angle at the vertex of a bending spring changes after a simulation step, the lengths of the two sides of this triangle may be equal. These two sides and the angle between them (i.e. the angle of displacement between the rest shape of the segment and its actual position) form a triangle whose area may be thought of as the sampling error. This sampling error may be calculated as the sine of the angle of displacement multiplied by the length of the segment (or as the cross product of the segments) divided by 2. In some embodiments, when this sampling error metric exceeds a pre-defined threshold, the curve editing module may be configured to subdivide the segment, e.g., by adding one or more new mass points in the curve model for this portion of the curve. This sampling error metric is illustrated in FIGS. 8A-8B, according to one embodiment. In this example (which illustrates a curve and an editing operation similar to those illustrated in FIGS. 5A-5B), a portion of a curve modeled as mass points connected by springs has been moved from its original position to a new position. The original portion of the curve is shown in FIG. 8A, and includes mass points $p_{i-1}$ (810), $p_i$ (820), and $p_{i+1}$ (830).

Figure 9A:
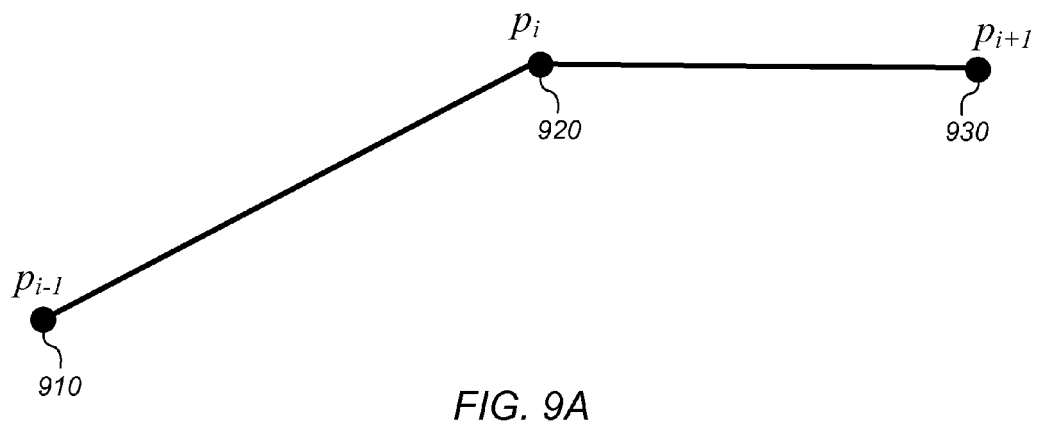
FIGS. 9A-9B illustrate the addition of mass points in a curve model, according to some embodiments.
Figure 9B:
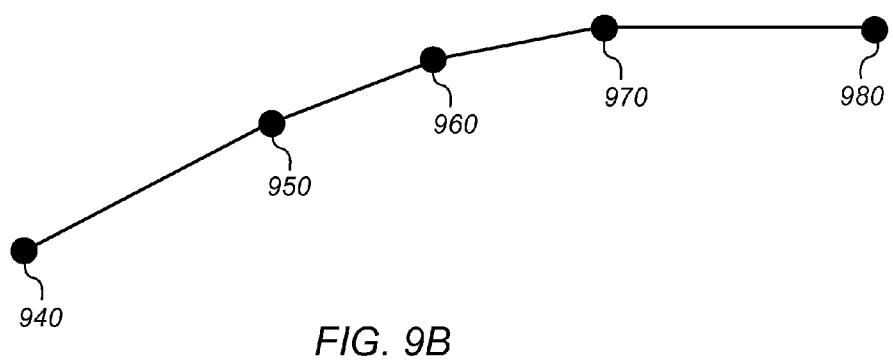

FIG. 8B illustrates the same portion of the curve after the point $p_{i+1}$ (830) has been moved to a new position (shown in FIG. 8B as $p'_{i+1}$ (840)). In FIG. 8B, the previous position of point $p_{i+1}$ is represented by the gray point (830) at the end of the solid gray line segment extending from point $p_i$ (820) in the direction of the original segment from $p_i$ (820) to $p_{i+1}$ (830). This represents the rest position of the segment that has been moved. In this example, the angular displacement due to manipulation of the curve is shown in FIG. 8B as $\Theta_i$ (850), and the dashed line (860) illustrates what the new shape of a real elastic wire represented by the curve model would be, after taking into account the constraints on the curve. For example, in some embodiments, the curve editor may be configured to adjust the curve model to correct or minimize this error by adding more mass points. Note that this resampling approach is illustrated in FIGS. 9A-9B, which depict the change in the rest shape of the curve following the physical simulation of the curve editing operation and the addition of two mass points. In some embodiments, a user may be able to specify an error tolerance (i.e. a value for the sampling error threshold) and/or there may be a default value for this parameter.

Note that there may be multiple approaches to adding new mass points as a result of the change in the shape of a curve, in different embodiments. For example, one approach may be to keep the rest shape of the curve model unchanged, but to add new mass points along the curve in its original rest shape. This approach may be used if the system assumes that the rest shape approximates all the important features well. However, it may add degrees of freedom by adding additional points at which subsequent curve manipulations and/or adjustments can be applied.

Another approach may be to add the new points such that the rest shape corresponding to the new sampling is smoother than the rest shape corresponding to the original sampling. This second approach is illustrated in FIGS. 9A-9B, according to one embodiment. In this example, FIG. 9A illustrates the original rest shape of a portion of a curve modeled as mass points and associated springs, and including points $p_{i-1}$ (910), $p_i$ (920) and $p_{i-1}$ (930). In this example, a curve editing operation similar to that described above in reference to FIGS. 8A-8B may have been applied to the curve. Note that in this example, the user may have moved point $p_{i+1}$ to a new position (such as the position shown as 840 in FIG. 8B), but instead of this manipulation resulting in a sharp corner at $p_i$, it may result in the smooth curve shown in 9B. In this example, FIG. 9B represents the new rest shape of the same curve portion following the addition of two mass points and corresponding changes in the rest angles between the mass points in this portion of the curve model. This portion of the curve model now includes five mass points, labeled in FIG. 9B as 940-980. This approach may also be used when the system assumes that the approximation of the rest shape of the original sampling is limited and the continuous rest shape is smooth. Note that in some embodiments, an adaptive re-sampling operation that adds or removes mass points may also redistribute the mass of the curve in the curve model, i.e. it may redistribute the mass of the continuous curve among the adjusted mass points in the curve model dependent on the distances between the mass points in the curve model.

As noted above, if and when fine sampling is no longer necessary for the curve (or a portion of the curve modeled using fine sampling), e.g., due to manipulation of the curve, the system may be configured to downsample the curve. The condition for triggering a downsampling operation may be the inverse of the condition for triggering an upsampling operation, with some hysteresis added to avoid oscillation between the denser and sparser states. However, the downsampling path may differ from the upsampling one. Therefore, in some embodiments the system may be configured to make sure that the features of the curve do not drift away, but remain in place, and that a series of upsampling and downsampling operations will eventually yield the original rest shape.

As described above, the curve editing module may be configured to automatically determine the initial mass points for an input curve, and a user may edit the curve by grabbing the curve at one of these mass points (i.e. selecting a mass point) and dragging it to a new position. In some embodiments, if the user grabs the curve at a position on the curve at which there is no mass point, a new mass point may be added at that position by the curve editing module, and the mass of the curve may be redistributed accordingly in the model. In response to the manipulation of the selected mass point, the curve editing module described herein may automatically add and/or remove mass points, i.e. in response to the change in the curve shape.

In some embodiments, the curve editor may provide a "melting tool" feature, which may allow a user to change the rest shape of the curve to its current shape between some editing operations, rather than accumulating changes to the curve and the forces acting on its mass points due to multiple editing operations. For example, after applying constraints and/or manipulating a curve multiple times, the springs of the curve model may still want to return to their original shape. To avoid this, a melting tool may be used to reset the rest shape of the curve between editing operations or following a collection of editing operations, depending on whether the user wants the modified shape of the curve to reflect the cumulative changes of multiple operations, or to be reset between edits. A melting tool feature may, when activated, remove the strain from the curve by setting the rest angles and rest lengths in the curve model to the current values. If the curve is being kept homogeneous, then the change in the rest length may result in change in mass, which though not physically correct, may be more desirable than an inhomogeneous curve.

Figure 10:
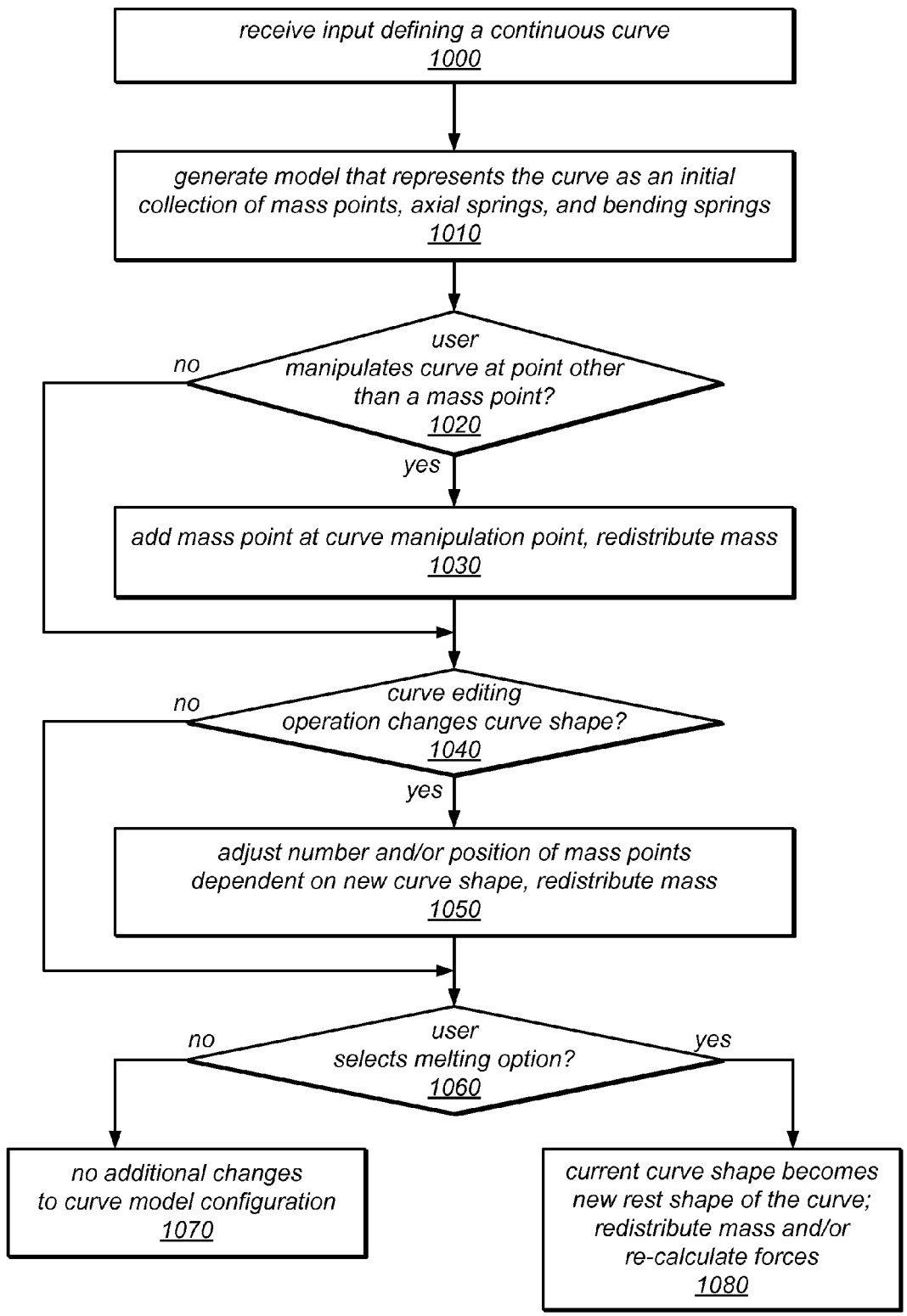
FIG. 10 is a flow diagram illustrating a method for generating and then adapting a curve model that includes mass points and associated springs, according to one embodiment.

FIG. 10 illustrates one embodiment of a method for generating and then adapting a curve model that includes mass points and associated springs, as described herein. As illustrated in this example, the method may include a curve editor receiving input defining a continuous curve, as in 1000. As noted above, the curve editor may receive curve data that is stored in memory, that has been loaded from memory as input to an image editing application, and/or that has been selected by a user to be a target of a curve editing operation. As illustrated at 1010, the curve editor may generate a model that represents the curve as an initial collection of mass points, axial springs, and bending springs, as described herein. In some embodiments, if a user manipulates the curve at a point other than a mass point (shown as the positive exit from 1020), the curve editor may add a mass point at the curve manipulation point, as in 1030. For example, user may select (and then drag) a point on the curve at which none of the initially generated mass points was defined. In response, the curve editor may be configured to add a mass point at the selected location and to redistribute the curve's mass due to the addition of the mass point. For example, the curve editor may be configured to determine the mass at the new mass point such that it is equal to the average of the masses of the two new segments formed by dividing one of the original segments of the curve model, and to determine new values for the masses of the mass points that were the end points of the original segment based on the masses of the two new segments.

As described above, in some embodiments, if a curve editing operation changes the shape of the curve, the curve editor may be configured to adjust the number and/or position of one or more of the mass points of the curve model dependent on its new shape. This is illustrated in FIG. 10 as the positive exit from 1040 and element 1050. For example, if an editing operation results in a need for finer granularity in the curve model for a portion of the curve (e.g., if the editing operation results in a curve shape with more changes of direction in that portion of the curve), the curve editor may add one or more mass points in this portion of the curve, and may redistribute the mass of the curve between the existing mass points and any added mass point accordingly. Conversely, if, following an editing operation, there is no longer a need for fine granularity in the model for a portion of the curve (e.g., if the editing operation results in a curve shape with fewer direction changes in that portion of the curve), the curve editor may remove one or more mass points in this portion of the curve, and may redistribute the mass of the curve between the remaining mass points accordingly.

As described above, in some embodiments, the curve editor may include a melting option. If such an option is selected (e.g., following an editing operation), the curve editor may be configured to make the current shape (i.e. one determined as a result of one or more curve editing operations) the new rest shape for the curve. This is illustrated in FIG. 10 as the positive exit from 1060 and element 1080. For example, if a melting option is selected, the curve editor may in some embodiments be configured to cause the rest angles and rest lengths in the curve model to be set to the current values of the angles and lengths (i.e. the angles between the mass points and the lengths of the segments in the curve model following the manipulation of the curve), and/or to redistribute the mass of the curve among the adjusted mass points. If the curve editor does not support a melting option, or if such an option is not selected (shown as the negative exit from 1060), no additional changes may be made to the curve model configuration, as shown in 1070.

In some embodiments, the curve editing module may include an interface through which a user can interactively drag and/or rotate a portion of a curve, while optionally keeping some points completely fixed, and/or some points fixed, but allowing rotations. For example, for a simulation in two dimensions, if the movement of a given mass point (the $i^{th}$ mass point) is constrained in the y direction (such that $\Delta v_i^y = z$) and it is free to move in the x direction, then the simulation may apply the original equation of motion in the x direction, but may use $\Delta v_i^y = z$ in the y direction. In this example, in the system of linear equations to be solved, the line corresponding to the movement of the $i^{th}$ mass point (due to forces acting on the mass point) in y direction may be replaced with $\Delta v_i^y = z$. Note that this approach may be generalized to higher dimensions as well.

In some embodiments, the user may set constraints on the angles defined by a set of mass points, or on the absolute direction of a segment defined by the two mass points it connects. By constraining the initial velocity and the acceleration of a point, the curve editing module may fully control its motion. When the motion of a mass point is constrained, the system may not use the original equations of motion to simulate the result, since additional constraint forces would need to be incorporated. Instead of using constraint forces, however, the system may directly incorporate the constraint conditions into the determination of the new curve shape. In other words, in some embodiments, when the motion of a point is fully constrained, they system may simply use the constraints to determine the new position of the fully constrained mass point instead of the equations of motion.

In some embodiments, when the motion is constrained only in certain directions, the system may change to a coordinate system in which the axes align with these directions. In such embodiments, the system may then use the constraint conditions to describe the motion along these axes. In this case, since no constraint forces appear in the directions of the other coordinate axes, the system may use the original equations of motion along those axes. In other words, the movement of a given mass point may be decomposed into its movement in one or more directions in which it is free to move (which may be modeled using the physical simulations described above), and its movement in other directions orthogonal to these free directions (which may constrained according to user input, e.g., to match the movement of another mass point). Such a coordinate system transformation may be used for each mass point.

For example, if the constrained direction(s) do(es) not coincide with the original coordinate axes, the approach described above may not be applicable. In this case, the simulation may use a different coordinate system. An example of such a coordinate transformation is illustrated in FIG. 13 and described below. This alternate approach may also be illustrated by way of the following detailed example, according to some embodiments. If a mass point's movement is constrained along one direction (designated by $u_i$, which is a unit vector), but is free to move in the orthogonal direction (designated as $u_i^\perp$), the equations for the point may be written in a $(u_i, u_i^\perp)$ coordinate system, instead of the (x, y) coordinate system. For example, the linear system equation in this alternate coordinate system would typically be: $u_i^T A_i \Delta v = u_i^T b_i$ in the constrained direction, but because constraint forces appear in this direction, it may be replaced instead by the constraints, yielding: $u_i^T \Delta v_i = u_i^T z_i$.

In this example, in the free direction, the simulation may use $u_i^{\perp T} A_i \Delta v = u_i^{\perp T} b_i$, which is not affected by the constraint. These scalar equations may then be multiplied by the direction vectors onto which they were projected, as follows:

$$u_i u_i^T \Delta v_i = u_i u_i^T z_i,$$

$$u_i^\perp u_i^{\perp T} A_i \Delta v = u_i^\perp u_i^{\perp T} b_i.$$

Then by using the notation $S_i = I - u_i u_i^T$, where I is the identity matrix, the system of equations can be rewritten as:

$$(I-S_i)\Delta v_i = (I-S_i)z_i,$$

$$S_i A_i \Delta v = S_i b_i.$$

Note that for higher dimension simulations, a similar product may be computed for all constrained directions. As these two equations are in orthogonal directions, they may be summed together. Substituting $(0 \ldots I \ldots 0)\Delta v = \Delta v_i$, yields:

$$(S_i A_i + (I-S_i)(0 \ldots I \ldots 0))\Delta v = S_i b_i + (I-S_i)z_i.$$

Note that this way the fully constrained case ($S_i = 0$), and the unconstrained case ($S_i = I$) may be expressed. A similar approach may be applied with all of the vertices, and the following block diagonal matrix may be constructed:

$$S = \begin{pmatrix} S_1 & \ldots & 0 \\ \vdots & \ddots & \vdots \\ 0 & \ldots & S_n \end{pmatrix}.$$

In this example, the system of equations to be solved is then given as:

$$(SA+(I-S))\Delta v = Sb+(I-S)z.$$

Figure 11:
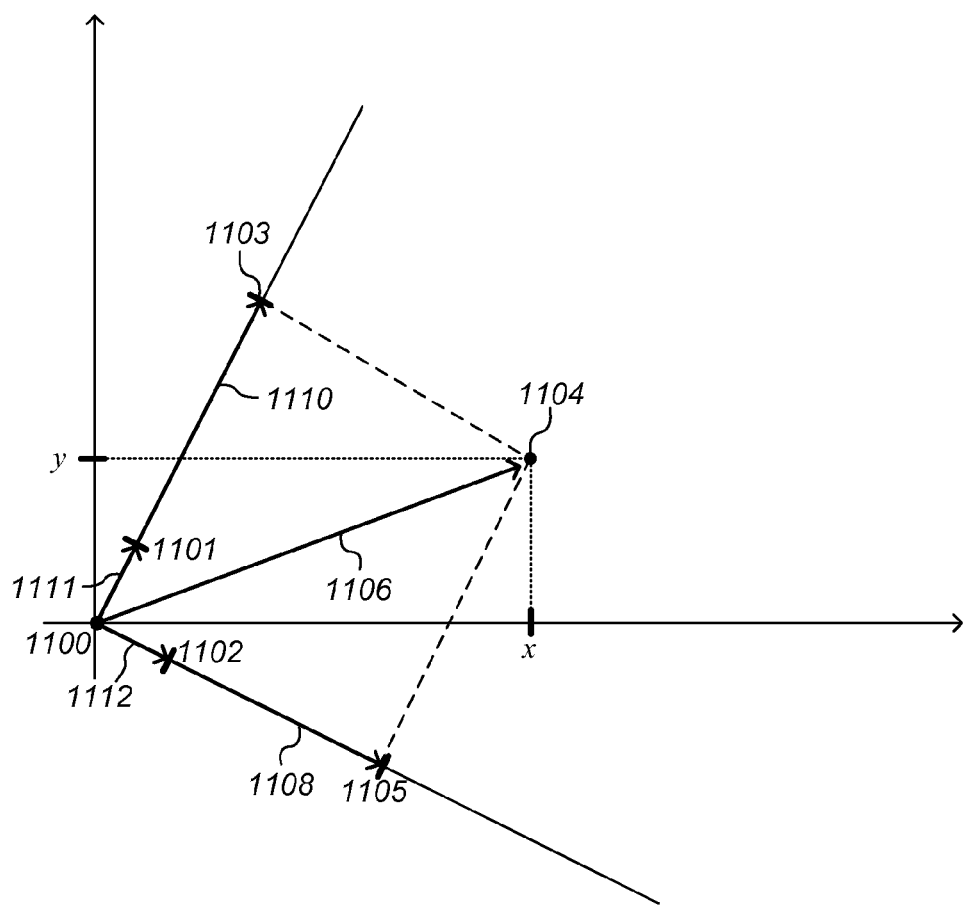
FIG. 11 illustrates a coordinate transformation performed as part of a curve editing operation, according to some embodiments.

An example of a coordinate transformation is illustrated in FIG. 11 and described below. In some embodiments, these transformations may be encoded in a single block diagonal matrix (S). In one example, if the original equations of motion are $Ax=b$ and the constraint conditions are $Bx=z$, then the linear system that provides the solution with the given constraints is $(SA+(I-S)B)x=Sb+(I-S)z$. In this example, S may work like a masking operator. If B is block band diagonal, then the resulting system matrix may also be block band diagonal.

An example of a coordinate transformation in 2D is illustrated in FIG. 11, according to some embodiments. In this example, point 1104 or the vector 1106 (pointing from point 1100 to point 1104) has in the original X-Y coordinate system coordinates (x, y)=x (1, 0)+y (0, 1). In this example, there is a change to another coordinate system, i.e. one in which the axes are shown by the vector 1111 pointing from point 1100 to point 1101 and the vector 1112 pointing from point 1100 to point 1102. In this example, vector 1111 represents the constrained direction ($u_i$), and vector 1112 represents the free direction ($u_i^\perp$). If the coordinates (c, d) correspond to the coordinates at which (x, y)=$cu_i + du_i^\perp$, then c=$u_i^T$(x, y), and d=$u_i^{\perp T}$ (x, y). In this example, c is then the length of vector 1110 (pointing from point 1100 to point 1103), and d is the length of vector 1108 (pointing from point 1100 to point 1105. In this example, the actual vector 1110 (which is the constrained component of vector 1106 pointing from point 1100 to point 1104) is $u_i u_i^T$ (x, y), and the actual vector 1108 (which is the free component of vector 1106) is $u_i^\perp u_i^{\perp T}$ (x, y). Using the notation $S_i = I - u_i u_i^T$, the constrained component of (x, y), which is shown as vector 1110, is $(I - S_i)$(x, y), and the free component of (x, y), which is shown as the vector 1108 is $S_i$(x, y).

The constraints described above may be considered "low level" constraints. In some embodiments, such low level constraints may be used to define higher level constraints, such as constraints on an absolute direction, rotation constraints, etc. In some embodiments, even these higher level constraints may be combined. For example, a constraint may be defined such that both neighbors may be rotated about a fixed mass point. Note also that when the user specifies such constraints (e.g., rotation about a point), the same constraint may constrain the movement of different points over the time. For example, a rotational constraint requires constraining the movement of the neighbor of a given mass point, but in some cases the actual neighbor of the mass point may change over time as a result of adaptive resampling.

Figure 12A:
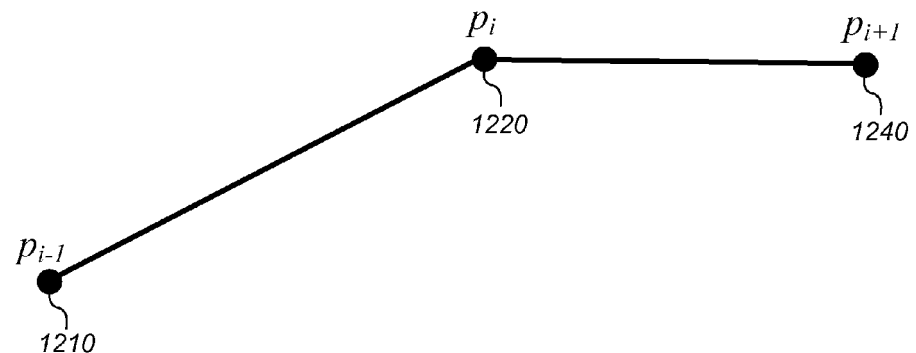
FIGS. 12A-12B illustrate the effect of a constraint on an absolute angle in a curve model during a curve editing operation, according to some embodiments.
Figure 12B:
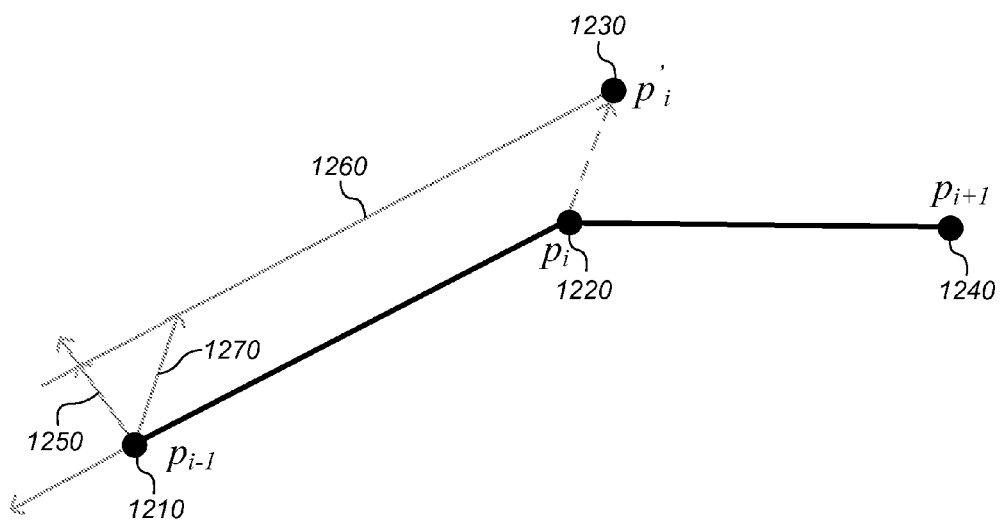

In some embodiments, simple positional constraints, such as those for fixing or moving points of the curve, may be easily expressed as described above. By constraining more vertices it may be possible to express more complex constraints. For example, the absolute angle defined by a point and its two neighbors may be fixed by allowing the neighbors to move only in the direction toward or away from the point, and by constraining the movement in the other directions to be the same as that of the point. In another example, the absolute direction of a segment defined by two mass points may be constrained. This is illustrated in FIGS. 12A-12B, according to one embodiment. FIG. 12A illustrates a portion of a curve modeled as mass points and associated springs, including points $p_{i-1}$ (1210), $p_i$ (1220), and $p_{i+1}$ (1240). In this example, the absolute direction of the portion of the curve defined by points $p_{i-1}$ (1210) and $p_i$ (1220) is fixed. In other words, the direction in which the movement of $p_{i-1}$ (1210) is constrained is orthogonal to the segment between $p_i$ and $p_{i-1}$, and is shown in FIG. 12B by the longer arrow (1250). In this example, the shorter arrow (1270) may represent the change of position of the $p_{i-1}$ point. Its projection to the constrained direction (shown as the longer portion of arrow 1250) yields the vector shown by the shorter portion of arrow 1250.

FIG. 12B illustrates the same portion of the curve after a manipulation of the curve such that point $p_i$ (1220) is moved to a new position, shown as point $p_i'$ (1230). In this example, since the absolute direction of the segment between points $p_{i-1}$ (1210) and $p_i$ (1220) is fixed, this direction may be preserved following the curve manipulation by moving point $p_{i-1}$ to any position along the long gray line (1260) whose endpoint is point $p_i'$ (1230). In other words, the additional force of the constraint (the direction of which is shown as by vector 1250 pointing away from point $p_{i-1}$) may cause the distance between the original segment between points $p_{i-1}$ (1210) and $p_i$ (1220), and the new segment between the new position of point $p_{i-1}$ (somewhere along line 1260) and point $p_i'$ (1230) to be constant, while the distance between $p_i'$ (1230) and the new position of $p_{i-1}$ along line 1260 may be arbitrary. In other words, by constraining the absolute direction of the segment between these mass points, when $p_i$ (1220) is moved, $p_{i-1}$ (1210) must follow, but $p_{i-1}$ (1210) can be moved anywhere along line 1260.

Figure 13A:
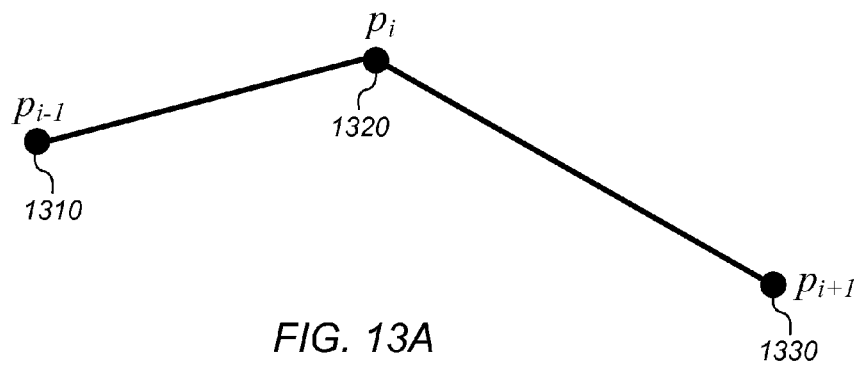
FIGS. 13A-13B illustrate the effect of a constraint to impose a rotation about a mass point during a curve editing operation, according to some embodiments.
Figure 13B:
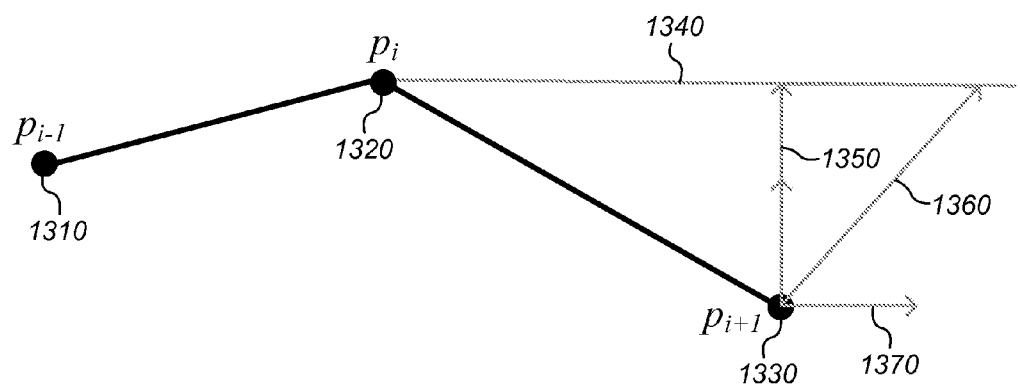

In another example, the curve editor described herein may support the application of a constraint to impose rotation about a mass point. When such a constraint is applied to a mass point, its neighbor may be free to move in the radial direction of the end configuration. This is illustrated in FIGS. 13A-13B, according to one embodiment. In this example, FIG. 13A illustrates the original shape of a portion of a curve modeled by mass points and associated springs, including points $p_{i-1}$ (1310), $p_i$ (1320), and $p_{i+1}$ (1330). In this example, the user may, when manipulating the curve, explicitly express the motion as a rotation about point $p_i$ (1320), and may indicate the angle of rotation by manipulation of point $p_{i+1}$ (1330). In this example, the rotation is expressed by moving the cursor without dragging the point $p_{i+1}$ (1330) to a specific position, but allowing it to move freely in the radial direction.

FIG. 13B illustrates that a new position of point $p_{i+1}$ may be determined by solving the linear system for the given constraints, and may be dependent on the direction and velocity of the movement of point $p_{i+1}$. In this example, vector 1370 represents the free direction (and is parallel to the line 1340). A vector is projected to this direction by multiplying the vector from the left by $S_{i+1}$ (as defined above). In this example, the shorter vector shown as 1350 represents the constrained direction. A vector is projected to this direction by multiplying it from the left by $(I-S_{i+1})$. In this example, the longer vector shown as 1350 represents the actual displacement (i.e. the change of position) of point $p_{i+1}$ (1330) in the constrained direction during the time step. In this example, if the point $p_{i+1}$ (1330) ends up being on line 1340, then this vector (the longer vector 1350) is the same as the vector going from $p_{i+1}$ (1330) to $p_i$ (1320) projected to the constrained direction (the shorter vector 1350). As noted above, this projection may be done by a multiplication, as $(I-S_{i+1})(p_i - p_{i+1})$.

In this example, 1360 represents the total change in the position of point $p_{i+1}$, which may be given by $((v_i + \Delta v_i)\Delta t)$. This may be decomposed into constrained and free components, with the constrained component being shown as the longer vector 1350. As illustrated in this example, the new position of $p_{i+1}$ at the end of the simulation time step may be anywhere along a line determined by the angle defined by the movement of $p_{i+1}$ (e.g., the horizontal gray line labeled as 1340 in FIG. 13B).

Figure 14:
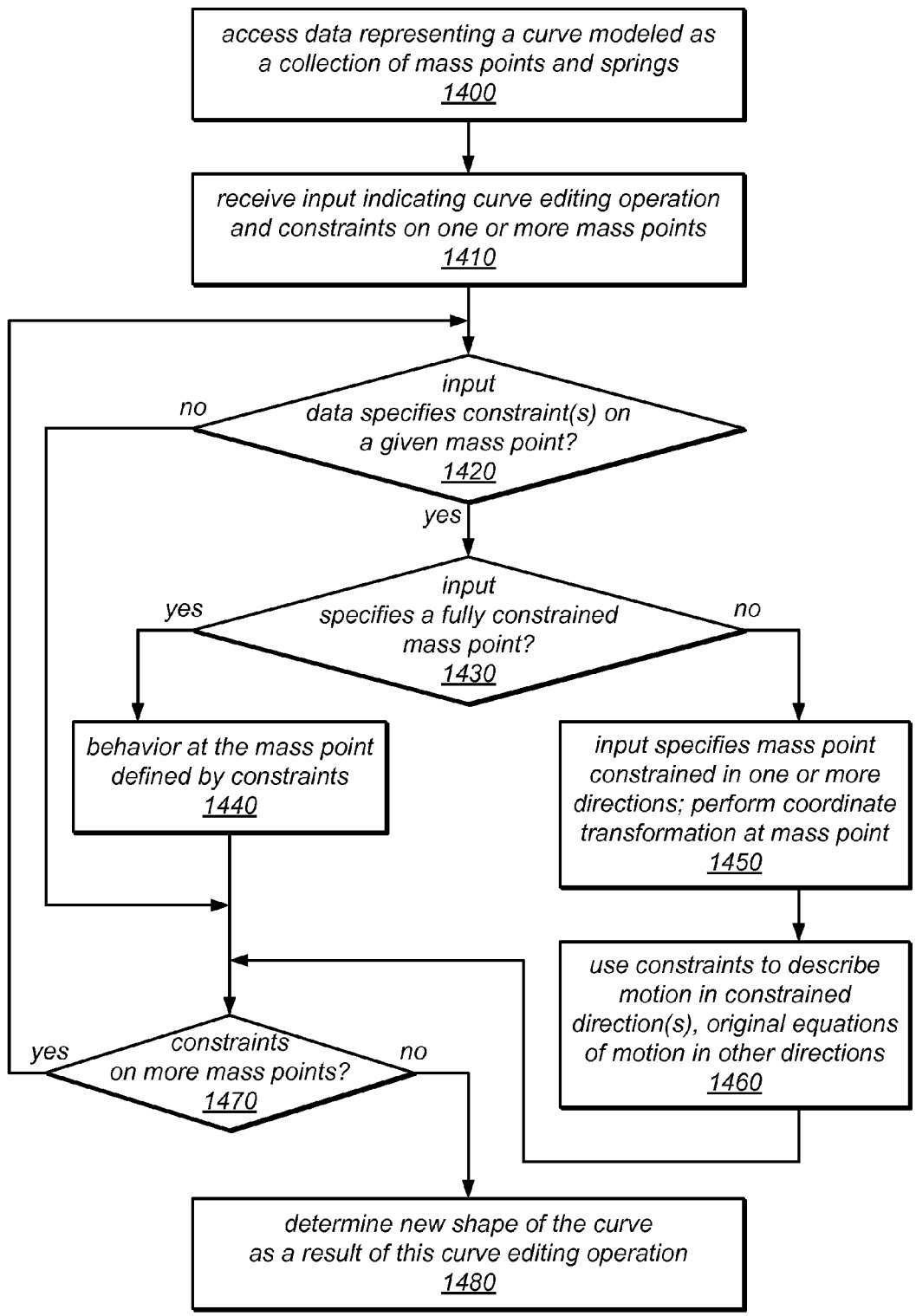
FIG. 14 is a flow diagram illustrating a method for applying constraints to a physically based simulation of a curve editing operation, according to one embodiment.

FIG. 14 illustrates one embodiment of a method for applying constraints to a physically based simulation of a curve editing operation. As illustrated at 1400, in this example, a curve editor may access data representing a curve modeled as a collection of mass points and associated springs (e.g., damped axial springs and damped bending springs). As noted above, the curve editor may obtain curve data that is stored in memory, that has been loaded from memory as input to an image editing application, and/or that has been selected by a user to be a target of a curve editing operation. The curve editor may also receive input indicating a curve editing operation and indicating one or more constraints on one or more mass points of the curve model, as in 1410. For example, the curve editor may provide a user interface through which various types of constraints may be applied to a curve that is the target of a curve editing operation. In various embodiments, a user may be able to identify mass points whose motion is to be fully constrained, mass points whose motion is constrained in some (but not all) directions, and/or mass points about which rotations are allowed (though the positions of the mass points themselves are constrained). In some embodiments, a user may also be able to constrain the initial velocity and/or acceleration of a selected mass point. In some embodiments, the velocity and acceleration of a mass point may come directly from the GUI, e.g., based on how fast it was dragged by the user.

As illustrated in FIG. 14, if input data specifies one or more constraints on a given mass point and the motion of the given mass point is fully constrained (shown as the positive exit from 1420 and the positive exit from 1430), the curve editor may determine the behavior of the curve at the given mass point as defined by its constraints, rather than using equations of motion, as in 1440. If input data specifies one or more constraints on a given mass point, but the motion of the given mass point is not fully constrained (shown as the positive exit from 1420 and the negative exit from 1430), the motion at the given mass point may be constrained in some directions, but not others, as in 1450. In this case, in order to determine the behavior of the curve at the given mass point, the curve editor may perform a coordinate transformation at the given mass point to align the axes with the directions in which its motion is constrained. The curve editor may then use the constraints to describe the motion of the mass point in the constrained direction(s) and the original equations of motion to describe the motion of the mass point in other directions, as in 1460.

If there are constraints on additional mass points of the curve model, shown as the positive exit from 1470, the curve editor may repeat the operations illustrated at 1420-1460 for these additional mass points (shown in FIG. 14 as the feedback from 1470 to 1420). Once all of the constraints have been taken into consideration, shown as the negative exit from 1470, the curve editor may determine the new shape of the curve as a result of this curve editing operation, as in 1480. For example, the curve editor may solve the system of equations describing the motion of the mass points involved in the editing operation that result from the application of the constraints on the curve model (i.e. on its mass points and springs) and taking into account compression, expansion, damping, bending, and/or drag forces at those mass points.

FIG. 14 illustrates an example flow for performing physically based curve editing, according to one embodiment. As illustrated at 1500, a curve editor may access data defining a continuous curve. As noted above, the curve editor may obtain curve data that is stored in memory, that has been loaded from memory as input to an image editing application, and/or that has been selected by a user to be a target of a curve editing operation. The curve editor may then generate a model that represents the curve as an initial collection of mass points, damped axial springs, and damped bending springs, as shown in 1510 and described herein. In some cases, the curve editor may receive input specifying one or more constraints on the curve, as in 1520. For example, in some embodiments the curve editor may provide a user interface through which users may place various types of constraints on an individual mass point or on related mass points. As described herein, these may include constraints on the movement at particular points, such as fixing the position or movement of one or more mass points, or an angle or direction defined by a set of mass points.

Figure 15:
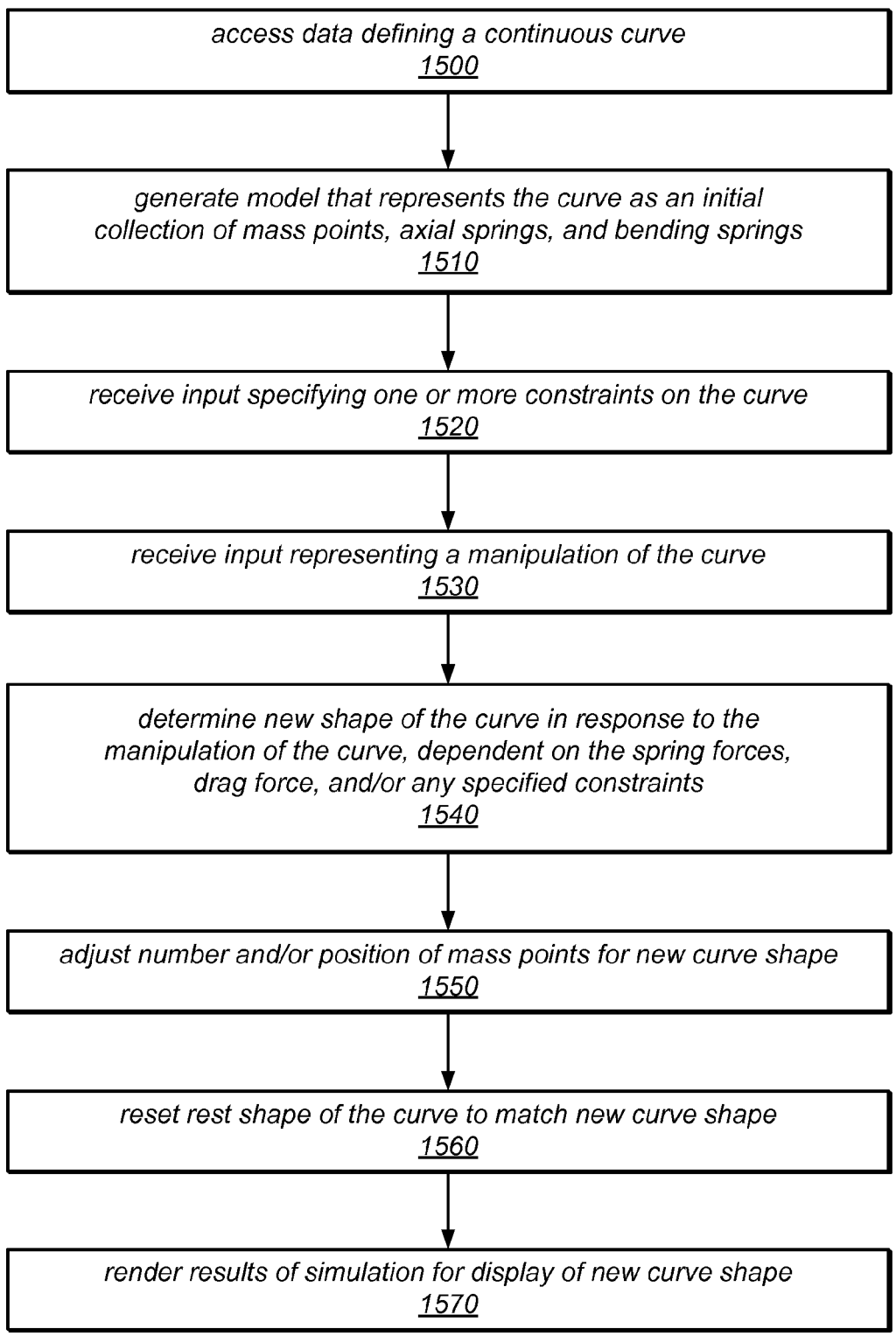
FIG. 15 is a flow diagram illustrating a method for performing physically based curve editing, according to some embodiments.

As illustrated in FIG. 15, the curve editor may receive input representing a manipulation of the curve, as in 1530. For example, the curve editor may provide a GUI through which a user can use to select and drag a mass point, which may cause other (connected) mass points to attempt to follow the selected mass point. In response to this input, the curve editor may use a physical simulation (such as those described herein) to determine the new shape of the curve, dependent on damped axial spring forces, damped bending spring forces, viscous drag forces, and/or any specified constraints, as in 1540.

As illustrated in this example, the curve editor may in some embodiments be configured to adjust the number and/or position of the mass points in the curve representation based on the new shape of the curve, as in 1550. In some embodiments, the curve editor may be configured to make the new shape become the rest shape for the curve, as in 1560. For example, in embodiments that support a "melting tool", selection of this feature may cause the rest angles and rest lengths to be set to the current values of the angles and lengths (i.e. the angles between the mass points and the lengths of the segments in the curve model following the manipulation of the curve). Finally, the curve editor may be configured to render results of the simulation for display of the new curve shape, as in 1570. For example, the curve editor may render the modified curve itself, or may pass simulation results to another module configured to render the modified curve and/or the digital image in which it is an element. As previously noted, the curve editor (or other rendering module) may use a different curve representation for rendering the results of the curve editing operation than that one used for the physically based curve editing simulation. In some embodiments, some or all of the operations illustrated in FIG. 15 may be repeated for each simulation time step within a given editing operation (e.g., each simulation time step within the time making up one select/drag motion, or mouse down/up motion), while others may only be performed once for given editing operation. For example, in various embodiments, adjusting the number and/or position of mass points, melting, and/or rendering results may be performed multiple times within a single editing operation or only once at the completion of the operation.

Example Implementations

Figure 16:
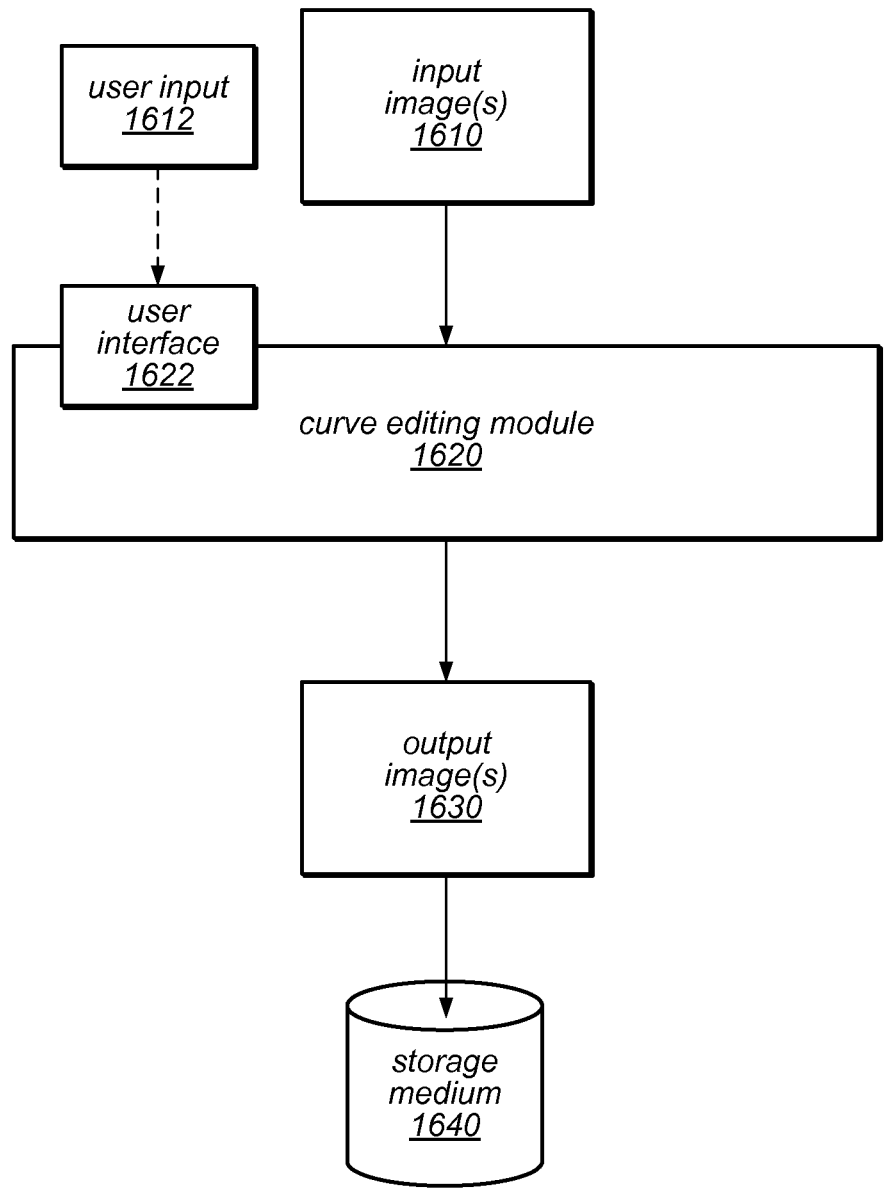
FIG. 16 is a block diagram illustrating a curve editing module that may implement physically based curve editing, according to some embodiments.

FIG. 16 illustrates a curve editing module that may implement one or more of the physically based curve editing techniques described herein. Curve editing module 1620 may, for example, implement one or more of a curve model generator, a physical simulator for simulating curve editing operations, a linear system solver, a melting tool, or other components to implement the techniques described herein. In various embodiments, curve editing module 1620 may be a standalone module, or may be a module of an image editing application (e.g., any application that can be used to draw or edit images, including digital drawing/painting programs, photo editing programs, games, etc.) FIG. 16, described in detail below, illustrates an example computer system on which embodiments of curve editing module 1620 may be implemented.

As illustrated in FIG. 16, curve editing module 1620 may receive as input one or more digital images 1610, some of which may include one or more continuous curves. An example of such a curve is shown in FIG. 2A. Curve editing module 1620 may be configured to generate a model of the curve, such as that illustrated in FIG. 2B. For example, in some embodiments, curve editing module 1620 may be configured to generate a curve model that includes mass points and associated springs in response to the selection of a curve in an input image 1610 on which an editing operation is to be performed (e.g., a selection made by a user via user interface 1622), or in response to the initiation of such a curve editing operation (e.g., in response to a user selecting and manipulating a point on a continuous curve in an input image 1610), in different embodiments.

In some embodiments, curve editing module 1620 may receive user input 1612 for setting or removing various constraints, for defining a manipulation of the curve (e.g., by selecting and/or dragging various mass points), or for activating a melting tool, as described herein. Curve editing module 1620 may be configured to perform the editing operation on the curve, according to the user input 1612 received via user interface 1622, generate a new shape of the curve, and/or adjust the number and/or position of various mass points of the curve model, as a result of the editing operation. In some embodiments, if the user activates a melting tool following a curve editing operation (or a series of curve editing operations), curve editing module 1620 may be configured to change the rest shape of the curve to the new shape resulting from the curve editing operation(s). In some embodiments, curve editing module 1620 may be configured to generate as output one or more modified images 1630 containing the modified curve. In other embodiments, output image(s) 1630 may be rendered by another module of an image editing application that includes curve editing module 1620. In some embodiments, rendering an output image 1630 that includes a curve modified by curve editing module 1620 may include modeling the resulting modified curve in a different manner than that used to model the curve during editing operations. For example, the curve (or an affected portion thereof) may be modeled as a collection of mass points and associated springs during a curve editing operation, but may be modeled as a Bezier curve or Catmull-Rom spline for rendering purposes and/or subsequent storage as part of an output image file. Output image(s) 1630 may, for example, be stored to a storage medium 1640, such as system memory, a disk drive, DVD, CD, etc.

In some embodiments, curve editing module 1620 may provide a user interface 1622 via which a user may interact with the curve editing module 1620, for example to activate a melting tool, to select a curve (or mass points thereof) for editing, to set or remove constraints on the curve, or to change the shape of the curve by dragging a selected mass point to stretch, compress, move, or rotate various portions of the curve, as described herein. In some embodiments, the user interface may provide user interface elements by which the user may select options including, but not limited to, various constraint parameters, and/or a sampling error tolerance. The user interface may also include user interface elements usable in loading or receiving an input image 1610 and/or saving a new or modified image 1630.

In various embodiments, the curve editing module described herein may include and/or call other modules to perform various functions of the curve editor. For example, different modules or sub-modules may be configured to perform generating a curve model, performing a physical simulation, solving a system of equations resulting from the simulation, resetting the curve model (melting), etc. Curve editing module 1620 illustrated in FIG. 16 may include any or all of these sub-modules, or they may be distinct from, and called by, curve editing module 1620, in different embodiments.

Some embodiments of the systems described herein may include a means for generating a curve model that includes a collection of mass points and associated springs. For example, a curve model generation module may receive input defining a continuous curve, and may generate a model of the curve (or a portion thereof) as a collection of mass points, damped axial springs, and/or damped bending springs, as described herein. The curve model generation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input defining a continuous curve, and generating a model of the curve (or a portion thereof) as a collection of mass points, damped axial springs, and/or damped bending springs, as described herein. Other embodiments of the curve model generation module may be at least partially implemented by hardware circuitry and/or firmware stored, for example, in a non-volatile memory.

Some embodiments of the systems described herein may include a means for simulating curve editing operations using a physical simulator. For example, a physical simulation module may receive data representing a curve model, data indicating a curve editing operation, and/or data specifying one or more constraints, and may simulate the manipulation of the curve due to the editing operation as a collection of physical forces (including axial spring forces, damping forces, bending springs, forces and/or drag forces) acting at various mass points of the curve model, as described herein. The physical simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving data representing a curve model, data indicating a curve editing operation, and/or data specifying one or more constraints, and simulating the manipulation of the curve due to the editing operation as a collection of physical forces (including axial spring forces, damping forces, bending springs, forces and/or drag forces) acting at various mass points of the curve model, as described herein. Other embodiments of the physical simulation module may be at least partially implemented by hardware circuitry and/or firmware stored, for example, in a non-volatile memory.

Some embodiments of the systems described herein may include a means for solving a linear system resulting from a physical simulation of a curve editing operation. For example, a linear solver module may receive data defining a linear system of equations generated by a physical simulation module in response to a curve editing operation, and may apply a direct solver to determine the effects of the curve editing operation on the curve, as described herein. The linear solver module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving data defining a linear system of equations generated by a physical simulation module in response to a curve editing operation, and applying a direct solver to determine the effects of the curve editing operation on the curve, as described herein. Other embodiments of the linear solver module may be at least partially implemented by hardware circuitry and/or firmware stored, for example, in a non-volatile memory.

Some embodiments of the systems described herein may include a means for a user to interact with a curve editing module, such as the curve editing module describe herein. For example, a user interface module may receive input defining a continuous curve, may receive input from the user defining an editing operation to be performed on the curve (or a portion thereof), may receive input from the user specifying one or more constraints on the curve or on the curve editing operation, and may display a modified version of the continuous curve resulting from the curve editing operation to the user, as described herein. The user interface module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input from a user defining a continuous curve, receiving input from the user defining an editing operation to be performed on the curve (or a portion thereof), receiving input from the user specifying one or more constraints on the curve or on the curve editing operation, and displaying a modified version of the continuous curve resulting from the curve editing operation to the user, as described herein. Other embodiments of the user interface module may be at least partially implemented by hardware circuitry and/or firmware stored, for example, in a non-volatile memory.

Some embodiments of the systems described herein may include a means for resetting the rest shape of a curve following one or more curve editing operations. For example, a curve melting module may receive data from a physically based curve simulation module and/or a linear solver module indicating the effect of a curve editing operation on a curve (or a portion thereof) modeled as a collection of mass points, damped axial springs, and/or damped bending springs, and may adjust the number of mass points in the curve model, the position of one or more mass points in the curve model, and/or the distribution of mass among the mass points in the curve model to cause the shape of the curve resulting from the curve editing operation to become the new rest shape of the curve, as described herein. The curve melting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving data from a physically based curve simulation module and/or a linear solver module indicating the effect of a curve editing operation on a curve (or a portion thereof) modeled as a collection of mass points, damped axial springs, and/or damped bending springs, and adjusting the number of mass points in the curve model, the position of one or more mass points in the curve model, and/or the distribution of mass among the mass points in the curve model to cause the shape of the curve resulting from the curve editing operation to become the new rest shape of the curve, as described herein. Other embodiments of the curve melting module may be at least partially implemented by hardware circuitry and/or firmware stored, for example, in a non-volatile memory.

Example System

Figure 17:
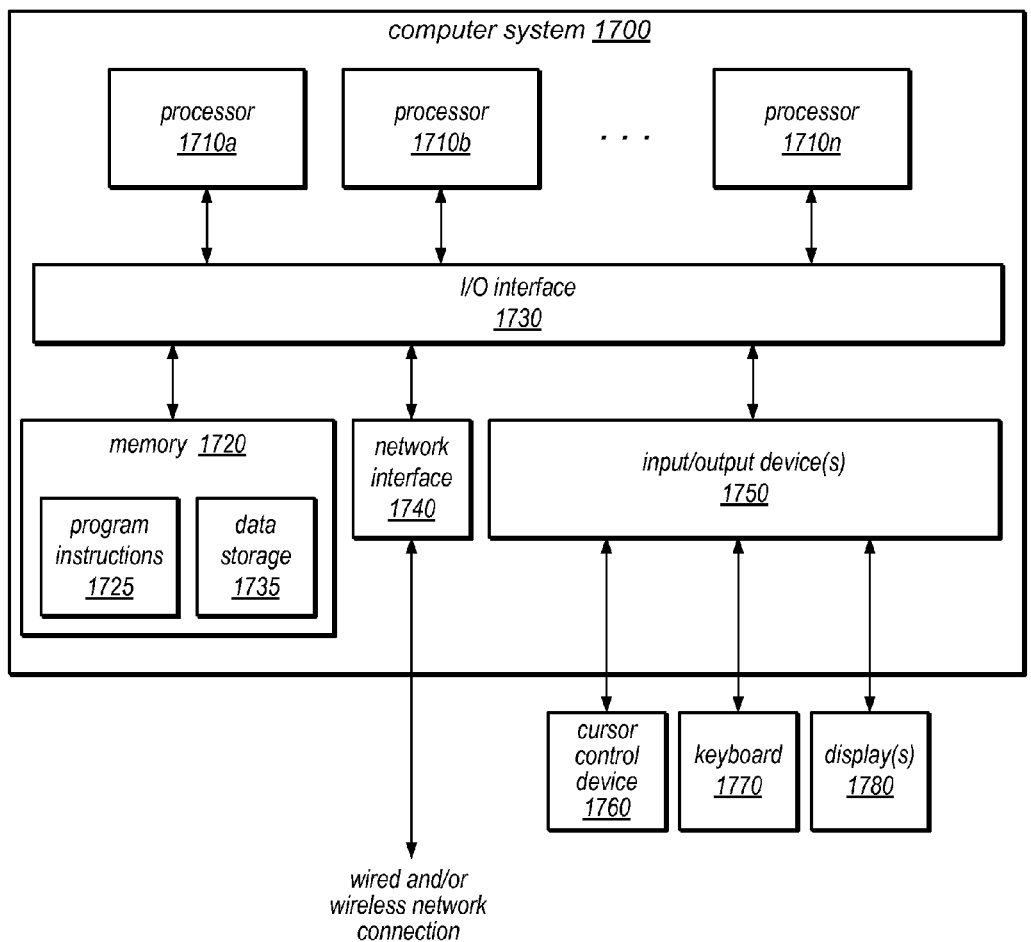
FIG. 17 illustrates an example computer system that may be used to perform physically based curve editing, in some embodiments.

Embodiments of a physically based curve editing module and/or of the curve editing techniques as described herein may be executed on one or more computer systems, which may interact with various other devices. One such computer system is illustrated by FIG. 17. In different embodiments, computer system 1700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730, and one or more input/output devices 1750, such as cursor control device 1760, keyboard 1770, and display(s) 1780. In some embodiments, it is contemplated that embodiments may be implemented using a single instance of computer system 1700, while in other embodiments multiple such systems, or multiple nodes making up computer system 1700, may be configured to host different portions or instances of a curve editing module. For example, in one embodiment some elements of the curve editing module may be implemented via one or more nodes of computer system 1700 that are distinct from those nodes implementing other elements of the curve editing module.

In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments, processors 1710 may be general-purpose or embedded processors implementing any of a variety of instruction set architectures (ISAs), such as the x86, PowerPC, SPARC, or MIPS ISAs, or any other suitable ISA. In multiprocessor systems, each of processors 1710 may commonly, but not necessarily, implement the same ISA.

In some embodiments, at least one processor 1710 may be a graphics processing unit. A graphics processing unit, or GPU, may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the curve editing and/or other image processing methods disclosed herein may be implemented, at least in part, by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1720 may be configured to store program instructions and/or data accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a physically based curve editing module, are shown stored within system memory 1720 as program instructions 1725 and data storage 1735, respectively. In other embodiments, program instructions and/or data may be received, sent or stored upon different types of computer-accessible media or on similar media separate from system memory 1720 or computer system 1700. Generally speaking, a computer-accessible medium may include storage media or memory media such as magnetic or optical media, e.g., disk or CD/DVD-ROM coupled to computer system 1700 via I/O interface 1730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1740.

In one embodiment, I/O interface 1730 may be configured to coordinate I/O traffic between processor 1710, system memory 1720, and any peripheral devices in the device, including network interface 1740 or other peripheral interfaces, such as input/output devices 1750. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. In addition, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network, such as other computer systems, or between nodes of computer system 1700. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1750 may, in some embodiments, include one or more display terminals, keyboards, keypads, touchpads, scanning devices, voice or optical recognition devices, or any other devices suitable for entering or retrieving data by one or more computer system 1700. Multiple input/output devices 1750 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1740.

As shown in FIG. 17, memory 1720 may include program instructions 1725, configured to implement embodiments of a physically based curve editing module as described herein, and data storage 1735, comprising various data accessible by program instructions 1725. In one embodiment, program instructions 1725 may include software elements of embodiments of a physically based curve editing module as illustrated in the above figures. Data storage 1735 may include data that may be used and/or generated by the curve editing module, in various embodiments. In other embodiments, more, fewer, or different software elements and data may be included in memory 1720.

Those skilled in the art will appreciate that computer system 1700 is merely illustrative and is not intended to limit the scope of a physically based curve editing module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc. In other embodiments, a computer-accessible medium may include transmission media or signals such as electrical, electromagnetic, or digital signals, conveyed via a communication medium such as network and/or a wireless link.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
using one or more computers to perform:
accessing data defining a continuous curve;
generating a model of the continuous curve comprising a plurality of mass points, each mass point having an assigned mass that is a sum of scaled masses of segments of the curve adjacent to the mass point based on curve density and cross section, and a plurality of springs whose forces act on the mass points, the forces being a damping force of an axial spring between the given mass point and a neighboring mass point;
receiving data indicating an editing operation to be performed on the continuous curve;
determining a modified shape of the continuous curve resulting from the editing operation, wherein said determining comprises performing a physical simulation that is dependent on spring forces acting on one or more of the mass points; and
storing data representing the continuous curve in its modified shape.

2. The method of claim 1, wherein the spring forces acting on a given mass point further comprise one or more of: a linear spring force that attempts to preserve the length of a segment between the given mass point and a neighboring mass point, a force of a bending spring that attempts to preserve an angle defined by the given mass point and a neighboring mass point on each side of the given mass point, or a damping force of a bending spring.

3. The method of claim 1, wherein the physical simulation is further dependent on viscous drag forces acting on one or more mass points.

4. The method of claim 1, wherein said generating a model of the continuous curve comprises:
determining an initial number of mass points in the curve model and an initial position of each of the mass points; and
distributing a mass of the continuous curve among the plurality of mass points in the curve model dependent on the distances between the mass points in the curve model.

5. The method of claim 4, further comprising:
responsive to input identifying a position on the continuous curve at which a mass point should be added, modifying the number of mass points or the position of one or more mass points; and
responsive to said modifying, redistributing the mass of the continuous curve.

6. The method of claim 4, further comprising:
responsive to the editing operation, modifying the number of mass points or the position of one or more mass points dependent on the modified shape of the continuous curve; and
responsive to said modifying, redistributing the mass of the continuous curve.

7. The method of claim 1, wherein said performing the physical simulation comprises applying a direct solver to a linear system in which the force acting on each given mass point at the end of a simulation time step is approximated by a first order polynomial dependent on the forces acting on the given mass point and the forces acting on one or more neighboring mass points on each side of the given mass point.

8. The method of claim 1, wherein the physical simulation is further dependent on one or more of: a constraint on a fixed position of a mass point, a constraint on an angle defined by three consecutive mass points, or a constraint on an absolute direction of a segment between two consecutive mass points.

9. The method of claim 1, further comprising:
responsive to receiving input indicating selection of a curve melting option, resetting a rest shape of the continuous curve in the curve model to the modified shape of the continuous curve.

10. The method of claim 1, further comprising:
rendering the continuous curve in its modified shape; and
displaying the continuous curve in its modified shape.

11. A system comprising:
one or more processors; and
memory coupled to the one or more processors, the memory comprising instructions executable by the one or more processors to:
access data defining a continuous curve;
generate a model of the continuous curve comprising a plurality of mass points, each mass point having an assigned mass that is a sum of scaled masses of segments of the curve adjacent to the mass point based on curve density and cross section, and a plurality of springs whose forces act on the mass points, the forces being a damping force of an axial spring between the given mass point and a neighboring mass point;
receive data indicating an editing operation to be performed on the continuous curve;
determine a modified shape of the continuous curve resulting from the editing operation, wherein said determination comprises performing a physical simulation that is dependent on spring forces acting on one or more of the mass points; and
store data representing the continuous curve in its modified shape.

12. The system of claim 11, wherein the spring forces acting on a given mass point further comprise one or more of: a linear spring force that attempts to preserve the length of a segment between the given mass point and a neighboring mass point, a force of a bending spring that attempts to preserve an angle defined by the given mass point and a neighboring mass point on each side of the given mass point, or a damping force of a bending spring.

13. The system of claim 11, wherein the instructions executable by the one or more processors to generate the model of the continuous curve comprise instructions to:
determine an initial number of mass points in the curve model and an initial position of each of the mass points; and
distribute a mass of the continuous curve among the plurality of mass points in the curve model dependent on the distances between the mass points in the curve model; and
wherein the instructions are further executable by the one or more processors to:
responsive to input identifying a position on the continuous curve at which a mass point should be added or dependent on the modified shape of the continuous curve resulting from the editing operation, modify the number of mass points or the position of one or more mass points; and
responsive to said modification, redistribute the mass of the continuous curve.

14. The system of claim 11, wherein to perform the physical simulation comprises applying a direct solver to a linear system in which the force acting on each given mass point at the end of a simulation time step is approximated by a first order polynomial dependent on the forces acting on the given mass point and the forces acting on one or more neighboring mass points on each side of the given mass point.

15. The system of claim 11, wherein the physical simulation is further dependent on one or more of: a constraint on a fixed position of a mass point, a constraint on an angle defined by three consecutive mass points, or a constraint on an absolute direction of a segment between two consecutive mass points.

16. One of more computer-readable storage memories comprising instructions executable by one or more processors to cause the one or more processors to:
 access data defining a continuous curve;
 generate a model of the continuous curve comprising a plurality of mass points, each mass point having an assigned mass that is a sum of scaled masses of segments of the curve adjacent to the mass point based on curve density and cross section, and a plurality of springs whose forces act on the mass points, the forces being a damping force of an axial spring between the given mass point and a neighboring mass point;
 receive data indicating an editing operation to be performed on the continuous curve;
 determine a modified shape of the continuous curve resulting from the editing operation, wherein said determination comprises performing a physical simulation that is dependent on spring forces acting on one or more of the mass points; and
 store data representing the continuous curve in its modified shape.

17. The one or more computer-readable storage memories of claim 16, wherein the spring forces acting on a given mass point further comprise one or more of: a linear spring force that attempts to preserve the length of a segment between the given mass point and a neighboring mass point, a force of a bending spring that attempts to preserve an angle defined by the given mass point and a neighboring mass point on each side of the given mass point, or a damping force of a bending spring.

18. The one or more computer-readable storage memories of claim 16, the instructions to generate the model of the continuous curve comprising instructions to:
 determine an initial number of mass points in the curve model and an initial position of each of the mass points; and
 distribute a mass of the continuous curve among the plurality of mass points in the curve model dependent on the distances between the mass points in the curve model; and
 the instructions being further executable by the one or more processors to cause the one or more processors to:
 responsive to input identifying a position on the continuous curve at which a mass point should be added or dependent on the modified shape of the continuous curve resulting from the editing operation, modify the number of mass points or the position of one or more mass points; and
 responsive to said modification, redistribute the mass of the continuous curve.

19. The one or more computer-readable storage memories of claim 16, wherein the physical simulation is further dependent on one or more of: a constraint on a fixed position of a mass point, a constraint on an angle defined by three consecutive mass points, or a constraint on an absolute direction of a segment between two consecutive mass points.

20. The one or more computer-readable storage memories of claim 16, wherein to perform the physical simulation comprises applying a direct solver to a linear system in which the force acting on each given mass point at the end of a simulation time step is approximated by a first order polynomial dependent on the forces acting on the given mass point and the forces acting on one or more neighboring mass points on each side of the given mass point.

* * * * *